(12) United States Patent
Murray et al.

(10) Patent No.: US 11,014,691 B2
(45) Date of Patent: May 25, 2021

(54) NOSE STRUCTURE FOR AN AIRCRAFT AND METHOD OF MAKING AN AIRCRAFT

(71) Applicant: The Boeing Company, Chicago, IL (US)

(72) Inventors: Robert W. Murray, Kirkland, WA (US); Richard A. Skilton, Bothell, WA (US)

(73) Assignee: The Boeing Company, Chicago, IL (US)

(*) Notice: Subject to any disclaimer, the term of this patent is extended or adjusted under 35 U.S.C. 154(b) by 130 days.

(21) Appl. No.: 16/530,004

(22) Filed: Aug. 2, 2019

(65) Prior Publication Data
US 2021/0031948 A1    Feb. 4, 2021

(51) Int. Cl.
*B64F 5/10* (2017.01)
*B64C 1/10* (2006.01)
*B64C 1/36* (2006.01)

(52) U.S. Cl.
CPC .................. *B64F 5/10* (2017.01); *B64C 1/10* (2013.01); *B64C 1/36* (2013.01)

(58) Field of Classification Search
CPC .......... B64F 5/10; B23P 2700/01; B64C 1/00; B64C 1/068; B64C 1/18; B64C 25/04; B64C 25/34
See application file for complete search history.

(56) References Cited

U.S. PATENT DOCUMENTS

| | | | |
|---|---|---|---|
| 6,213,428 B1 | 4/2001 | Chaumel et al. | |
| 7,641,146 B2 | 1/2010 | Wood et al. | |
| 8,016,234 B2 | 9/2011 | Muller et al. | |
| 8,118,259 B2 | 2/2012 | Guering | |
| 8,366,041 B2 | 2/2013 | Ricaud et al. | |
| 8,905,352 B2 | 12/2014 | Bernadet et al. | |
| 8,915,470 B2 | 12/2014 | Bernadet et al. | |
| 9,108,719 B2 | 8/2015 | Sankrithi et al. | |
| 9,452,817 B1 | 9/2016 | Sankrithi | |
| 10,124,879 B2* | 11/2018 | Vinches | B64D 11/00 |
| 10,343,768 B2* | 7/2019 | Bellet | B64C 1/18 |
| 10,562,604 B2* | 2/2020 | Guering | B64C 1/10 |
| 2010/0001129 A1 | 1/2010 | Guering | |
| 2013/0146709 A1 | 6/2013 | Bernadet et al. | |
| 2013/0146710 A1 | 6/2013 | Bernadet et al. | |
| 2014/0175223 A1 | 6/2014 | Durand et al. | |

OTHER PUBLICATIONS

European Patent Office, Extended European Search Report, App. No. 20189177.7 (Jan. 15, 2021).

\* cited by examiner

*Primary Examiner* — Jason L Vaughan
(74) *Attorney, Agent, or Firm* — Walters & Wasylyna LLC

(57) ABSTRACT

A method of making an aircraft includes steps of: assembling a subfloor assembly, including a panel support and plurality of transport elements; coupling a wheel well assembly to an airframe of the aircraft to form a nose landing gear bay of the aircraft; forming a pressure boundary delimiting a pressurized space and a non-pressurized space with the wheel well assembly and the airframe; coupling the subfloor assembly to the wheel well assembly, in the pressurized space, to form a portion of a floor of the aircraft so that the plurality of transport elements is located between the panel support and the wheel well assembly; and coupling the plurality of transport elements to at least one high-level system of the aircraft.

27 Claims, 25 Drawing Sheets

NOSE STRUCTURE FOR AN AIRCRAFT AND METHOD OF MAKING AN AIRCRAFT

FIELD

The present disclosure is generally related to structures of aircraft and, more particularly, to a nose structure for an aircraft that uses a wheel well assembly to form a portion of a floor, form a nose landing gear bay, and delimit a pressurized space and a non-pressurized space of the aircraft.

BACKGROUND

An aircraft for transport of passengers and freight includes a fuselage that is usually separated into at least one pressurized space and at least one non-pressurized space. The pressurized space includes zones that require pressurization during flight, such as a flight deck for the flight crew, a cabin for the passengers, and a cargo hold for baggage and other varied cargo. The non-pressurized space includes zones that do not require pressurization during flight, such as storage compartments for landing gear. Typically, an aircraft includes two main landing gears that are typically placed under the wings and a nose landing gear that is centered under the front end of the fuselage. A storage compartment for the nose landing gear is typically located under the floor of the aircraft. Conventional nose landing gear storage compartments include two discrete components: a support structure that must be strong enough to withstand stresses applied to the nose landing gear and strong enough to transfer loads from the nose landing gear into the forward fuselage; and a pressure barrier that forms a boundary between the pressurized space and the non-pressurized space of the fuselage. Additionally, the space between the support structure, the pressure barrier, and the fuselage typically houses various operational components of the aircraft. However, this space is difficult to access and accounts for a significant waste of volume in the fuselage.

Accordingly, those skilled in the art continue with research and development efforts in the field of pressure barriers for aircraft and, more particularly, to pressure barriers that delimit a nose landing gear storage compartment.

SUMMARY

The following is a non-exhaustive list of examples, which may or may not be claimed, of the subject matter according to the present disclosure.

In an example, a disclosed nose structure of an aircraft includes an airframe and a wheel well assembly. The wheel assembly is coupled to the airframe and forms a portion of a nose landing gear bay. The wheel well assembly includes a pressure deck. The pressure deck extends from a right side of the airframe to a left side of the airframe. The pressure deck forms a portion of a pressure boundary delimiting a pressurized space and a non-pressurized space.

In another example, the disclosed nose structure of an aircraft includes an airframe. The airframe includes a pressure deck that forms a portion of a pressure boundary delimiting a pressurized space and a non-pressurized space. The nose structure also includes a floor-panel support that is supported by the pressure deck 118 in the pressurized space. The nose structure further includes a plurality of operational components, located in the pressurized space between the floor-panel support and the pressure deck. The plurality of operational components is associated with at least one high-level system of the aircraft.

In an example, a disclosed aircraft includes an airframe, forming a nose structure of the aircraft, and at least one high-level system. The aircraft also includes a wheel well assembly, coupled to the airframe and forming a portion of a nose landing gear bay. The wheel well assembly includes a pressure deck that extends from a right side of the airframe to a left side of the airframe and that forms a portion of a pressure boundary delimiting a pressurized space and a non-pressurized space. The aircraft further includes a floor-panel support, supported by the pressure deck. The aircraft also includes a plurality of transport elements, located between the floor-panel support and the pressure deck. The pressure deck and the floor-panel support form a portion of a floor of the aircraft that delimits a flight deck, arranged over the floor in the pressurized space, and the nose landing gear bay, arranged under the floor in the non-pressurized space. The plurality of transport elements is in communication with the at least one high-level system. The plurality of transport elements is accessible from within the flight deck.

In an example, a disclosed airframe of an aircraft includes an external skin. The airframe also includes a first bulkhead, coupled to the external skin running transversely between a right side of the airframe and a left side of the airframe. The airframe further includes a second bulkhead, longitudinally spaced away from the first bulkhead and coupled to the external skin running transversely between the right side of the airframe and the left side of the airframe. The airframe also includes a pressure deck, coupled to the first bulkhead, the second bulkhead, and the external skin running longitudinally between the first bulkhead and the second bulkhead and running transversely between the right side of the airframe and the left side of the airframe. The pressure deck, the first bulkhead, and the second bulkhead at least partially delimit a pressurized space and a non-pressurized space of the aircraft.

In another example, the disclosed aircraft includes a fuselage, at least one high-level system, and a floor. The floor includes a pressure deck, coupled to the fuselage and forming at least a portion of a pressure boundary delimiting a pressurized space and a non-pressurized space. The floor also includes a floor-panel support, supported by the pressure deck in the pressurized space. The floor further includes a plurality of transport elements, located between the floor-panel support and the pressure deck. The plurality of transport elements is in communication with the at least one high-level system of the aircraft.

In another example, the discloses aircraft includes an airframe and a wheel well assembly, coupled to the airframe. The wheel well assembly and the airframe form a nose landing gear bay. The aircraft also includes a nose landing gear that is stowable within the nose landing gear bay. The nose landing gear includes a trunnion, coupled to the wheel well assembly. The nose landing gear also includes a strut, coupled to the trunnion. The nose landing gear further includes an axle, coupled to the strut, opposite to the trunnion. The nose landing gear also includes a wheel, coupled to the axle. With the nose landing gear stowed within the nose landing gear bay, the axle is located closer to a central longitudinal axis of the aircraft than the trunnion.

In an example, a disclosed method of making an aircraft includes steps of: (1) assembling a subfloor assembly, including a floor-panel support and plurality of transport elements; (2) coupling a wheel well assembly to an airframe of the aircraft to form a nose landing gear bay of the aircraft; and (3) coupling the subfloor assembly to the wheel well assembly to form a portion of a floor of the aircraft so that the plurality of transport elements is located between the floor-panel support and the wheel well assembly.

In another example, the disclosed method of making an aircraft includes steps of: (1) coupling a wheel well assembly to an airframe of the aircraft; (2) forming a nose landing gear bay from the wheel well assembly and the airframe; (3) coupling a nose landing gear to the wheel well assembly; and (4) stowing the nose landing gear within the nose landing gear bay so that an axle of the nose landing gear is located closer to a central longitudinal axis of the aircraft than a trunnion of the nose landing gear.

In another example, the disclosed method of making an aircraft includes steps of: (1) coupling a pressure deck to an airframe of the aircraft, wherein the pressure deck extends from a right side of the airframe to a left side of the airframe; (2) coupling a nose landing gear box to the pressure deck and to the airframe, wherein the nose landing gear box is located rearward of the pressure deck; (3) forming a portion of a pressure boundary that delimits a pressurized space and a non-pressurized space of the aircraft with the pressure deck, the nose landing gear box, and the airframe; (4) forming a portion of a nose landing gear bay of the aircraft, located in the non-pressurized space, with the pressure deck, the nose landing gear box, and the airframe; (5) coupling a floor-panel support to the pressure deck and to the nose landing gear box in the pressurized space to form a flight deck floor of a flight deck above the nose landing gear bay; (6) accessing an interior volume of the aircraft, located between the nose landing gear box and the airframe, from within the flight deck through the floor-panel support.

In an example, a disclosed method of accessing a portion of an aircraft includes steps of: (1) entering an interior volume of the aircraft, formed by an airframe, a wheel well assembly, coupled to the airframe, and a floor panel-support, coupled to the wheel well assembly, through the floor-panel support; and (2) accessing at least a portion of the wheel well assembly from within the interior volume.

Other examples of the disclosed airframe structure, aircraft, and method will become apparent from the following detailed description, the accompanying drawings and the appended claims.

DETAILED DESCRIPTION

Figure 1:
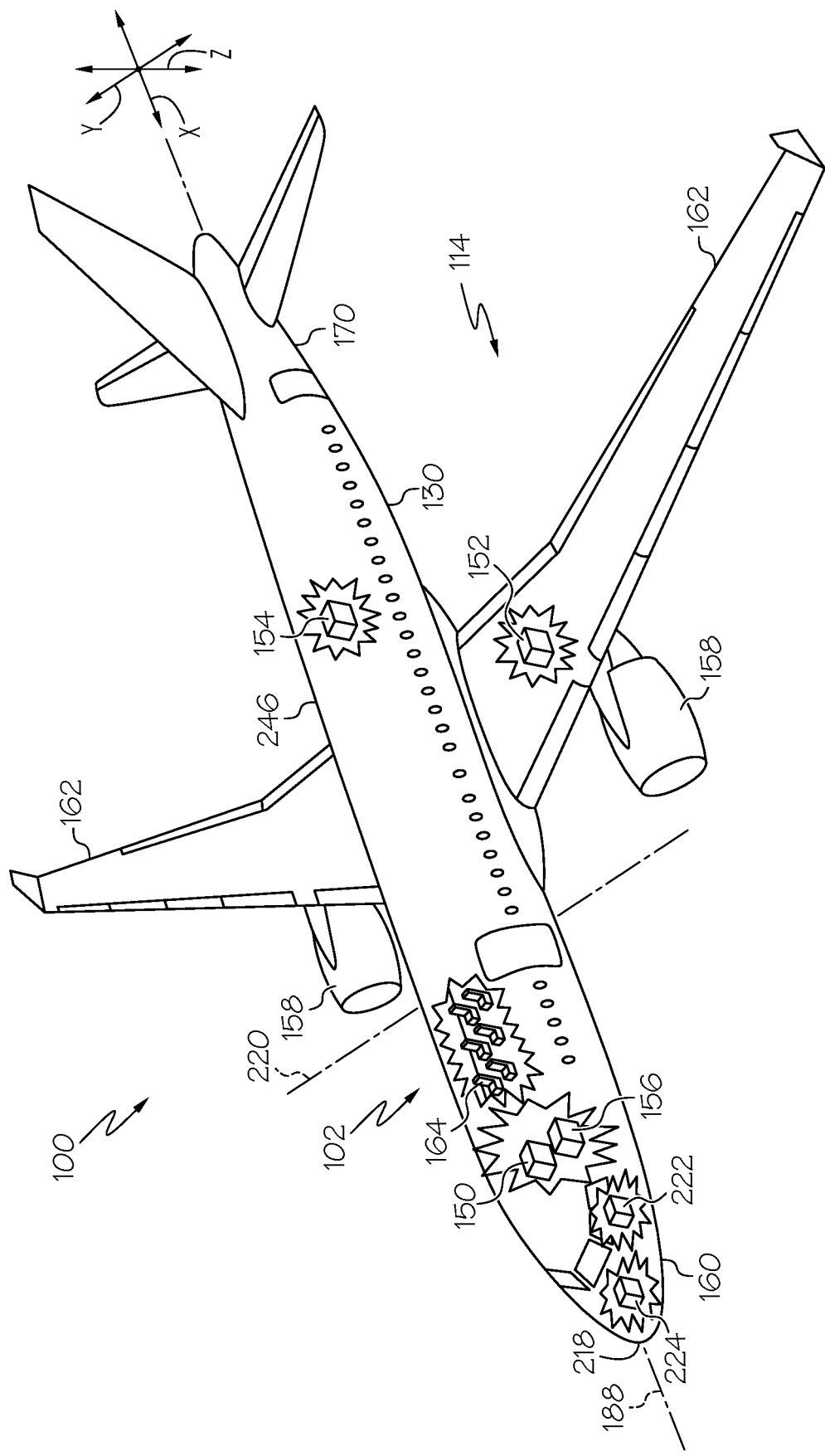
FIG. 1 is a schematic illustration of an example of an aircraft.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-14, by way of examples, the present disclosure describes an aircraft 100, an airframe 102 of the aircraft 100, and a nose structure 160 of the aircraft 100. More specifically, the present disclosure describes examples of a wheel well assembly 194 that forms a portion of a nose landing gear bay 124 of the aircraft 100, a portion of a floor 204 of the aircraft 100, and a portion of a pressure boundary 104 that delimits a pressurized space 106 and non-pressurized space 108. The configuration of the disclosed nose structures 160 beneficially improves aerodynamic performance characteristics of the aircraft 100, reduces the weight of the aircraft 100, reduced assembly time and cost of the aircraft 100, reduces recurring costs associated with inspection and maintenance of the aircraft 100, and improves access to areas around the nose landing gear bay 124.

FIG. 1 schematically illustrates an example of an aircraft 100. In the illustrative example, the aircraft 100 is a fixed-wing aircraft. In other examples, the aircraft 100 has any one of various other configurations. The aircraft 100 includes an airframe 102. The airframe 102 forms a framework of a fuselage 130 and a pair of wings 162 of the aircraft 100. In the illustrative example, the fuselage 130 includes a nose structure 160, at least one cylindrical barrel section 246, and a tail 170.

The aircraft 100 includes a central longitudinal axis 188 and a transverse axis 220. The central longitudinal axis 188 runs through a center of the fuselage 130 from a forward end of the aircraft 100 to an aft end of the aircraft 100. For example, the central longitudinal axis 188 runs through a center of a section cut of the cylindrical barrel section 246 of the fuselage 130. The transverse axis 220, also referred to as a lateral axis, runs from a left side of the aircraft 100 to a right side of the aircraft 100 and is perpendicular to the central longitudinal axis 188.

Throughout the present disclosure, a relative location of a structure, element, or component of the aircraft 100 may be referred to as being "forward of," "aft of," or "rearward of" another structure, element, or component. As used herein, the terms "forward," "front," "aft," "rear," and similar terms have their ordinary meaning as known to those skilled in the art and refer to positions relative to a direction of movement of the aircraft 100. Similarly, as used herein, the term "forward direction" refers to a direction running from an aft location to a forward location and the term "rearward direction" refers to a direction running from a forward location to an aft location.

Figure 2:
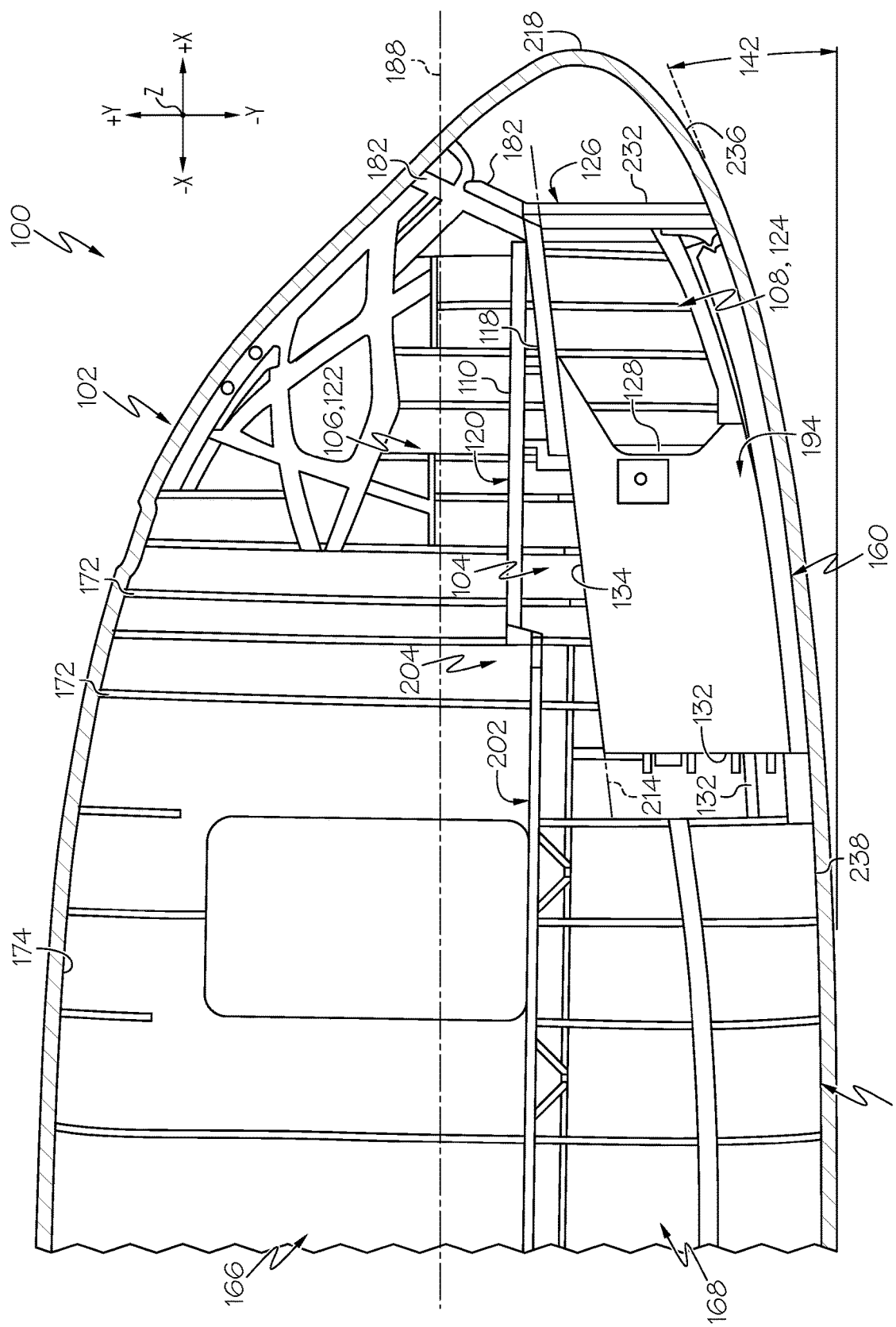
FIG. 2 is a schematic, side elevational view, in partial cutaway, of an example of a nose structure of the aircraft.

Throughout the present disclosure, a relative position and/or orientation of a structure, element, or component of the aircraft 100 may be described in an orthogonal frame of reference of axes X, Y, Z (FIGS. 1 and 2). For example, the central longitudinal axis 188 is parallel to the X-axis and the transverse axis 220 is parallel to the Y-axis. As used herein, the terms "horizontal," "horizontally," and similar terms refer to a structure, element, or component being parallel to the XY-plane. The terms "vertical," "vertically," and similar terms refer to a structure, element, or component being perpendicular to the XY-plane. Throughout the present disclosure, horizontal and vertical also include approximately horizontal and approximately vertical, respectively.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy. For example, the term "approximately" refers to a condition that is within 10% of the stated condition. However, the term "approximately" does not exclude a condition that is exactly the stated condition.

The fuselage 130 is the main body of the aircraft 100 and forms an interior 164 of the aircraft 100. The interior 164 is configured to hold a flight crew, one or more passengers, and/or cargo. In the illustrative example, the fuselage 130 is an elongate, generally cylindrical fuselage.

Figure 3:
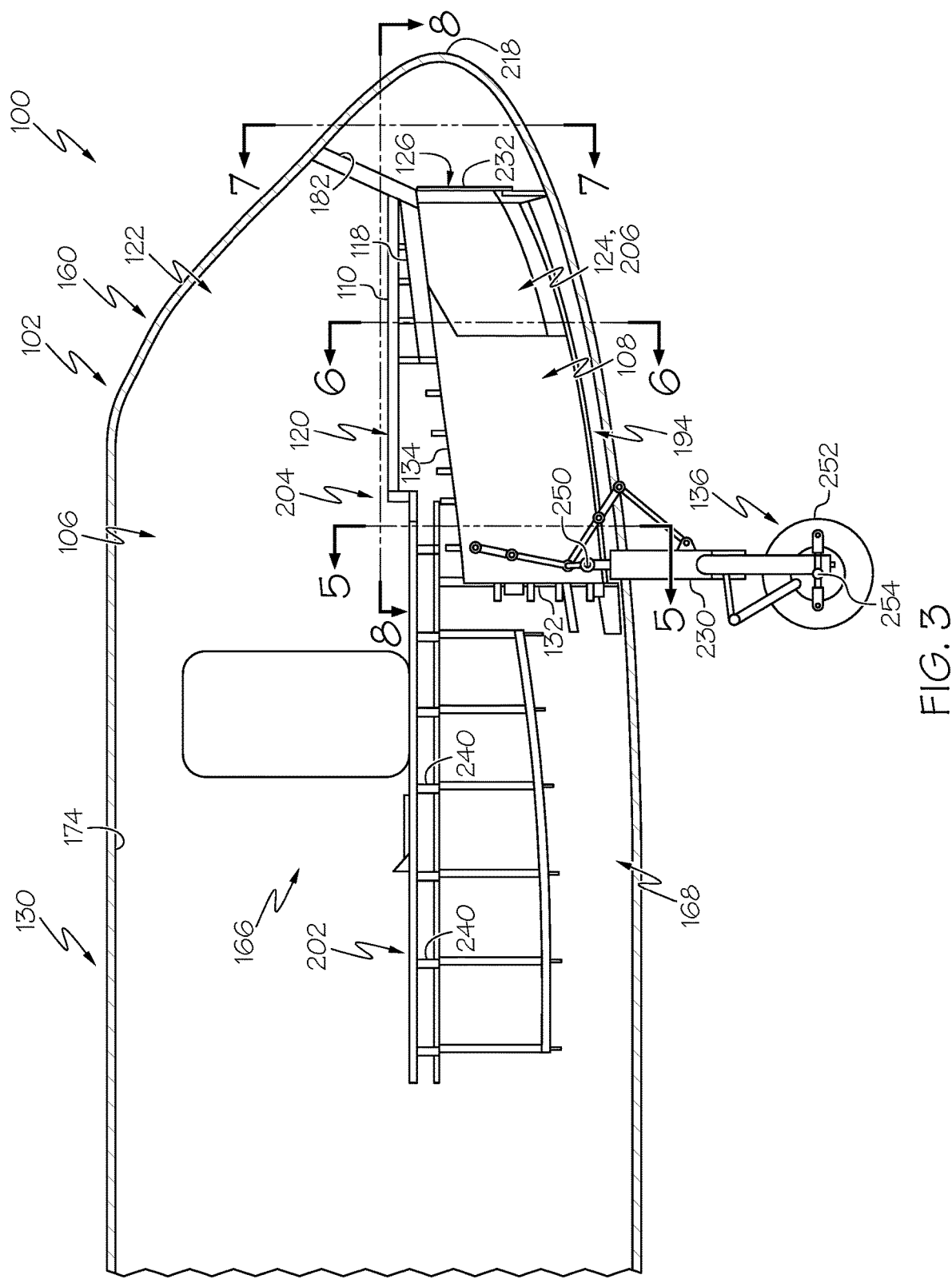
FIG. 3 is a schematic, side elevational view, in partial cutaway, of an example of the nose structure of the aircraft.

The nose structure 160 of the aircraft 100 forms a front portion (or forward end) of the fuselage 130, the tail 170 forms a rear portion (or aft end) of the fuselage 130, and the cylindrical barrel section 246 forms an intermediate portion of the fuselage 130. In an example, the nose structure 160 includes a portion of the fuselage 130 running from the cylindrical barrel section 246 (e.g., a constant cross-sectional portion) of the fuselage 130 to a tip 218 of a nose of the fuselage 130 and having a variable cross-section, viewed along the central longitudinal axis 188. In another example, the nose structure 160 includes a forwardmost segment of a multi-segment fuselage 130 that includes a flight deck 122 (FIG. 3) and a nose landing gear bay 124 (FIG. 3). The tail 170 may include at least one vertical stabilizer and/or at least one horizontal stabilizer.

The aircraft 100 also includes a set of retractable landing gear (not shown in FIG. 1). The set of landing gear includes two main landing gears (not shown in the Figures) and a nose landing gear 136 (FIG. 3). Each landing gear is articulated to support the aircraft 100 on the ground and to be retracted after takeoff. The two main landing gears are typically located under the wings 162. The nose landing gear 136, also commonly referred to as the front landing gear, is typically located under the front portion (e.g., the nose) of the fuselage 130 and centered along the central longitudinal axis 188.

The aircraft 100 also includes a plurality of high-level systems 114. The high-level systems 114 include, but are not limited to, at least one of an electrical system 150, a hydraulic system 152, an environmental system 154, a communications system 156, a propulsion system 158, a flight control system 222, and a radar system 224. Any number of other systems may also be included.

Figure 4:
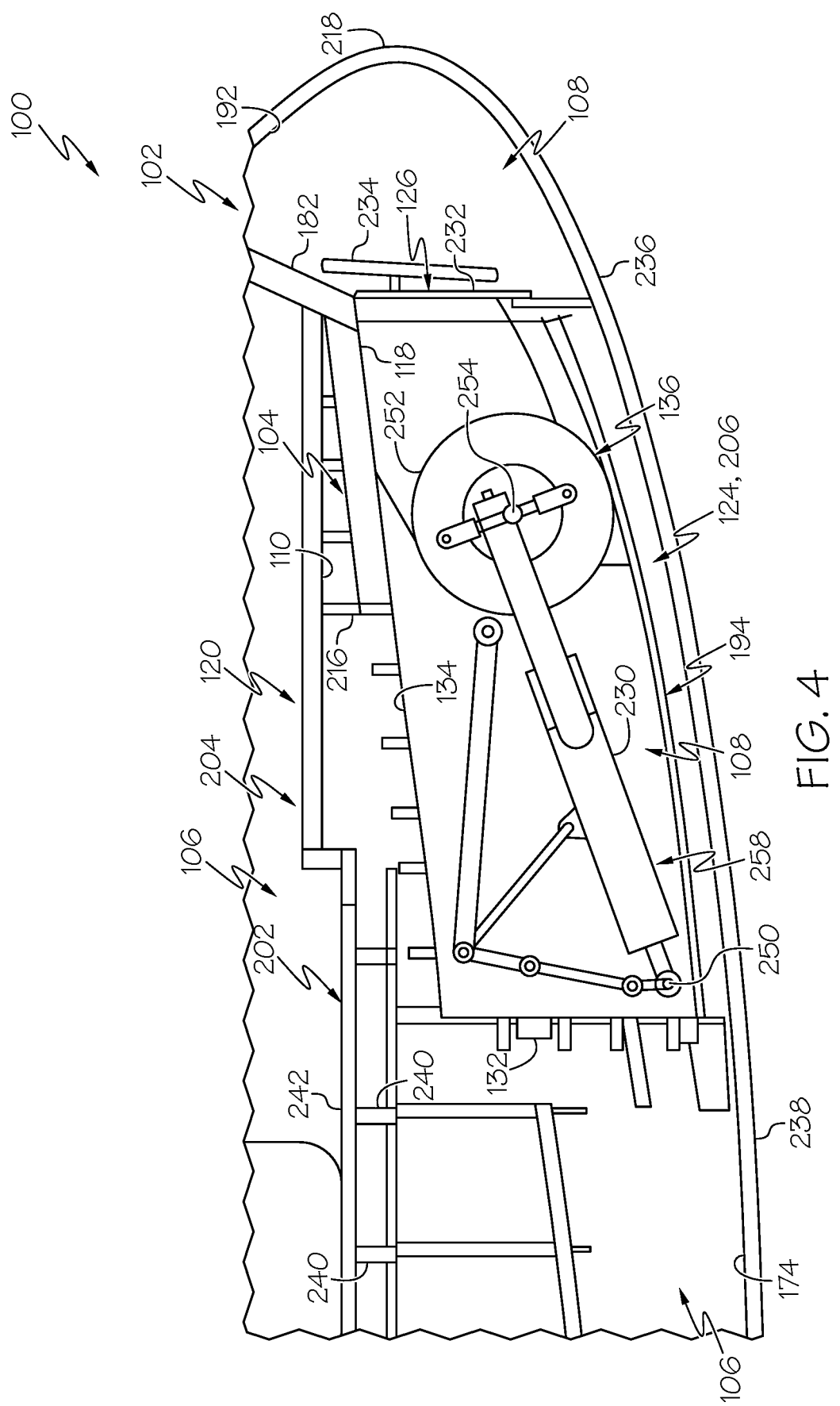
FIG. 4 is a schematic, side elevational view, in partial cutaway, of an example of the nose structure of the aircraft.

Referring to FIGS. 2-9, in an example, the nose structure 160 includes at least a portion of the airframe 102 of the aircraft 100. In FIG. 2, a portion of an external skin 174 of the airframe 102 is cutaway to show the wheel well assembly 194 and the floor 204 of the aircraft 100. In FIGS. 3 and 4, certain portions of the airframe 102 (e.g., frames 172) are not shown for clarity of illustration.

Referring to FIG. 2, in an example, the airframe 102 includes a plurality of frames 172. The frames 172 are the main structural members of the fuselage 130 and establish the shape of the fuselage 130. The frames 172 include annular members or semi-annular members that are perpendicular to and extend circumferentially around the central longitudinal axis 188 of the fuselage 130. The frames 172 are longitudinally spaced apart along the central longitudinal axis 188.

The external skin 174 is coupled to the frames 172 and extends circumferentially around the central longitudinal axis 188. Typically, the external skin 174 includes a plurality of skin panels. In some examples, the airframe 102 also includes a plurality of stiffening members (not shown in the Figures), commonly referred to as stringers. The stiffening members are coupled to an interior surface of the external skin 174 and to the frames 172. The stiffening members are oriented generally parallel to each other and extend generally parallel to the central longitudinal axis 188 of the fuselage 130.

Figure 8:
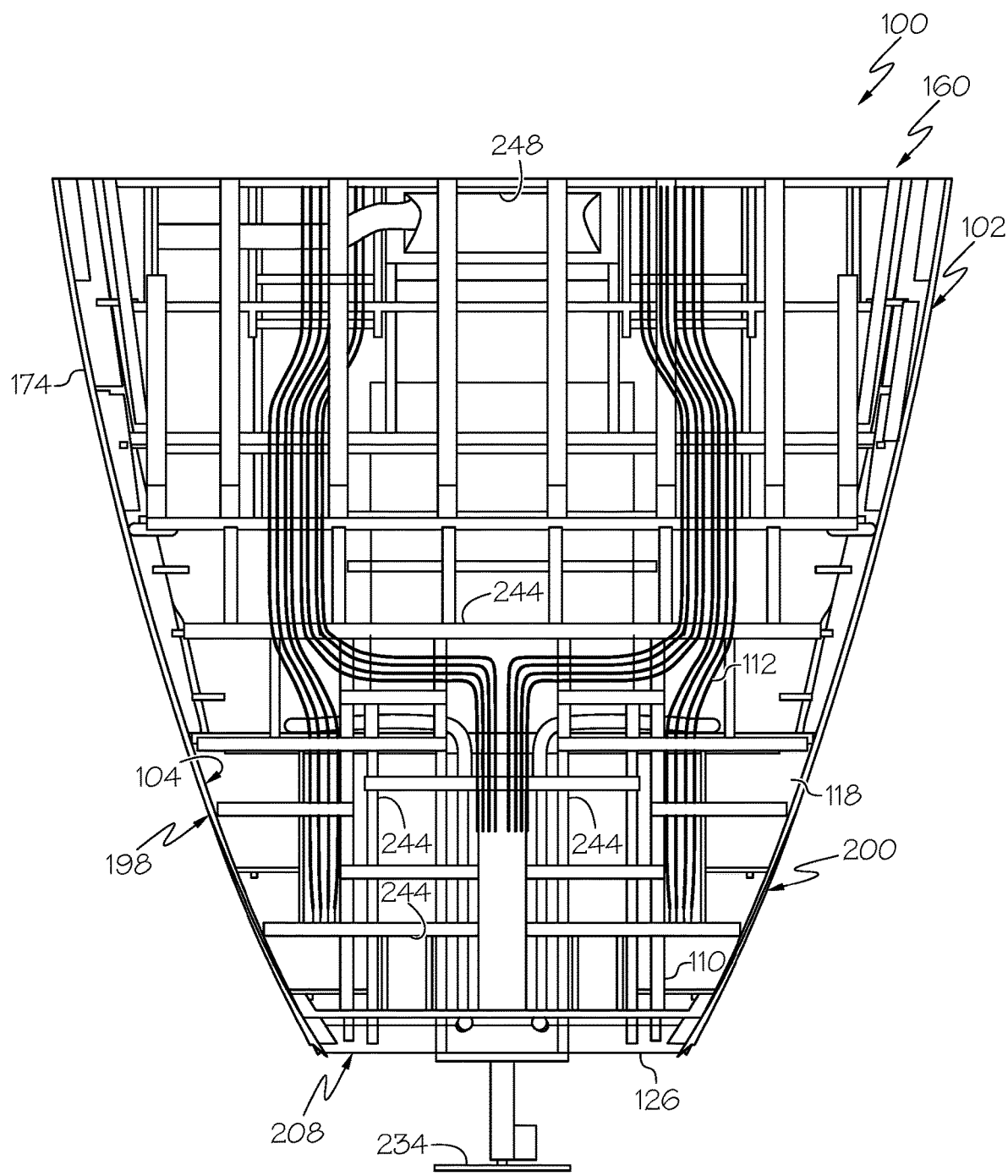
FIG. 8 is a schematic, sectional view of the nose structure of the aircraft, on line 8-8 of FIG. 3.
Figure 9:
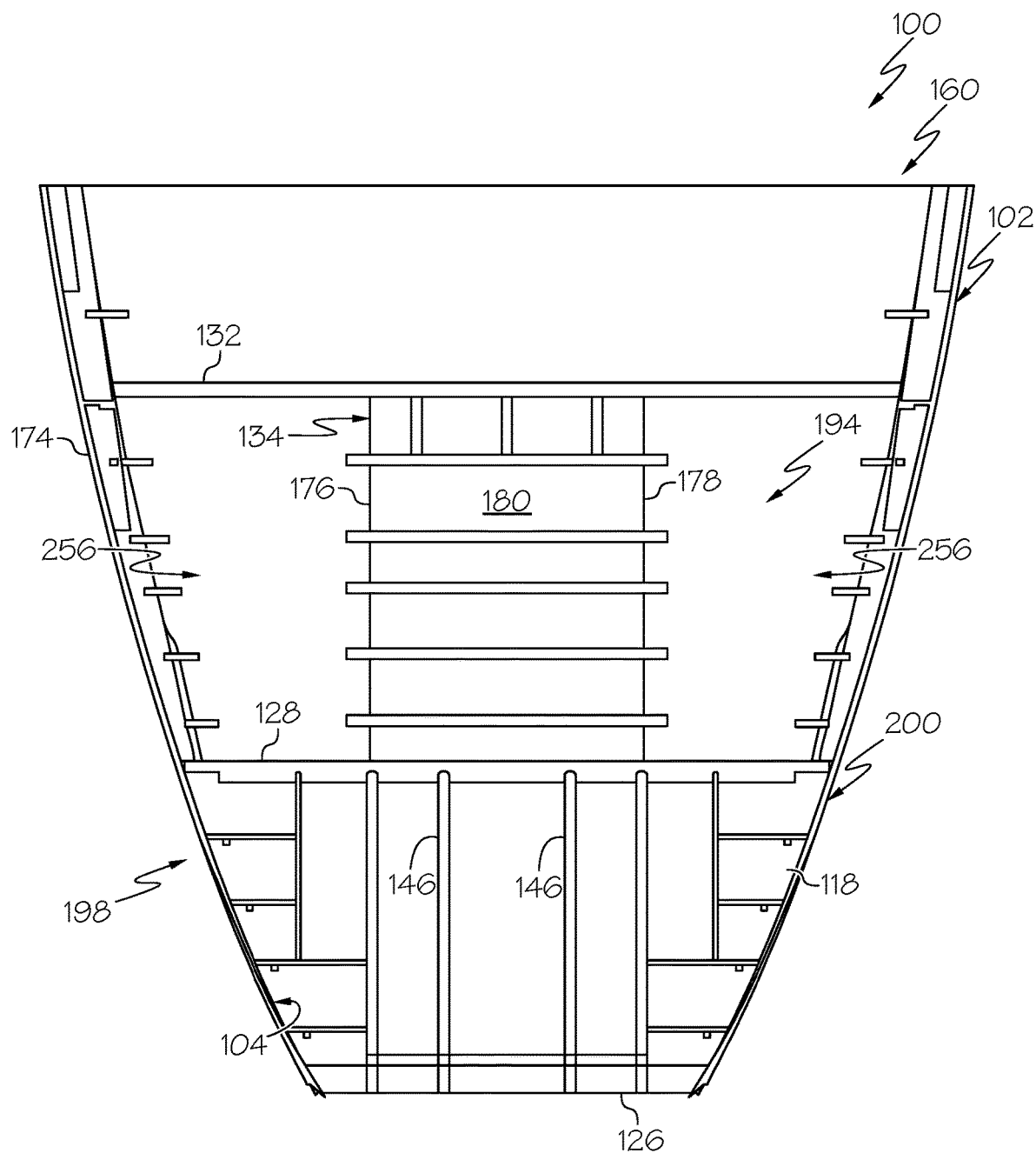
FIG. 9 is a schematic, top plan view of an example of the nose structure of FIG. 8 with a subfloor assembly removed.

Referring to FIGS. 2-14, in an example, the nose structure 160 includes the airframe 102 and the wheel well assembly 194. The wheel well assembly 194 is coupled to the airframe 102. The wheel well assembly 194 forms a portion of a nose landing gear bay 124 (FIGS. 2-6). The wheel well assembly 194 includes a pressure deck 118. The pressure deck 118 extends from a right side 198 of the airframe 102 to a left side 200 of the airframe 102, as illustrated in FIGS. 6, 8, and 9. The pressure deck 118 forms a portion of a pressure boundary 104 delimiting a pressurized space 106 and a non-pressurized space 108.

Referring to FIGS. 2-4, 6, 8 and 12-14, in an example, the nose structure 160 also includes a floor-panel support 110. The floor-panel support 110 is supported by the pressure deck 118 in the pressurized space 106, as illustrated in FIGS. 2-4 and 6. The pressure deck 118 and the floor-panel support 110 form a portion of a flight deck floor 120 of the flight deck 122 (also commonly referred to as a cockpit) of the aircraft 100, as illustrated in FIGS. 2-4 and 6.

Referring to generally to FIGS. 2-4 and particularly to FIGS. 5, 6, 8 and 12-14, in an example, the nose structure 160 further includes a plurality of transport elements 112 (FIGS. 5, 6, 8 and 12-14). The plurality of transport elements 112 is located between the floor-panel support 110 and the pressure deck 118. The plurality of transport elements 112 is associated with at least one of the high-level systems 114 (FIG. 1) of the aircraft 100. In FIGS. 2-4, the plurality of transport elements 112, located between the floor-panel support 110 and the pressure deck 118, is not shown for clarity of illustration.

The wheel well assembly 194 facilitates connection of the nose landing gear 136 to the airframe 102 and stowage of the nose landing gear 136 within the nose landing gear bay 124 when the nose landing gear 136 is retracted. The wheel well assembly 194 also facilitates the transfer of loads transmitted by the nose landing gear 136 to the airframe 102. The connection interfaces between the wheel well assembly 194 and the airframe 102 (e.g., the external skin 174) create the pressure boundary 104 that delimits the pressurized space 106 and the non-pressurized space 108. Supporting the floor-panel support 110 with the pressure deck 118 of the wheel well assembly 194 to form the flight deck floor 120 and locating the plurality of transport elements 112 (FIGS. 5, 6, and 8) between the floor-panel support 110 and the pressure deck 118 optimizes the space available in the nose structure 160 and reduces the volume required by the nose structure 160 to accommodate the plurality of transport elements 112 and the nose landing gear bay 124.

As used herein, the term "pressurized space" refers to a space that is configured to be or that is capable of being pressurized when the aircraft 100 is at altitude. As used herein, the term "non-pressurized space" refers to a space that is not configured to be or that is not capable of being pressurized. As used herein, the term "pressure boundary" refers to an interface or joint between structures that serves as a pressure barrier between a pressurized space and a non-pressurized space. For example, two structures that are coupled together and hermetically closed (e.g., sealingly coupled) form a pressure boundary that can withstand a pressure differential.

As illustrated in FIG. 3, in an example, the aircraft 100 includes the flight deck 122, a passenger compartment 166, a cargo compartment 168, and the nose landing gear bay 124. The floor 204 separates the fuselage 130 into the flight deck 122 and the passenger compartment 166, which are located above the floor 204, and the cargo compartment 168 and the nose landing gear bay 124, which are located below the floor 204. In an example, the floor 204 includes the flight deck floor 120 and a passenger deck floor 202. The flight deck floor 120 forms the main deck of the flight deck 122 and separates the flight deck 122 and the nose landing gear bay 124. The passenger deck floor 202 forms the main deck of the passenger compartment 166 and separates the passenger compartment 166 and the cargo compartment 168. In an example, the pressurized space 106 forms the flight deck 122, the passenger compartment 166, and the cargo compartment 168. The non-pressurized space 108 forms the nose landing gear bay 124.

Referring to FIGS. 8 and 12-14, in an example, the floor-panel support 110 includes a plurality of beams 244. In an example, a portion of the plurality of beams 244 runs longitudinally and another portion of the plurality of beams 244 runs transversely to form a grid pattern. In an example, the plurality of floor panels 116 is supported by and is coupled to the plurality of beams 244. In an example, at least a portion of the plurality of transport elements 112 is coupled to the plurality of beams 244.

Figure 5:
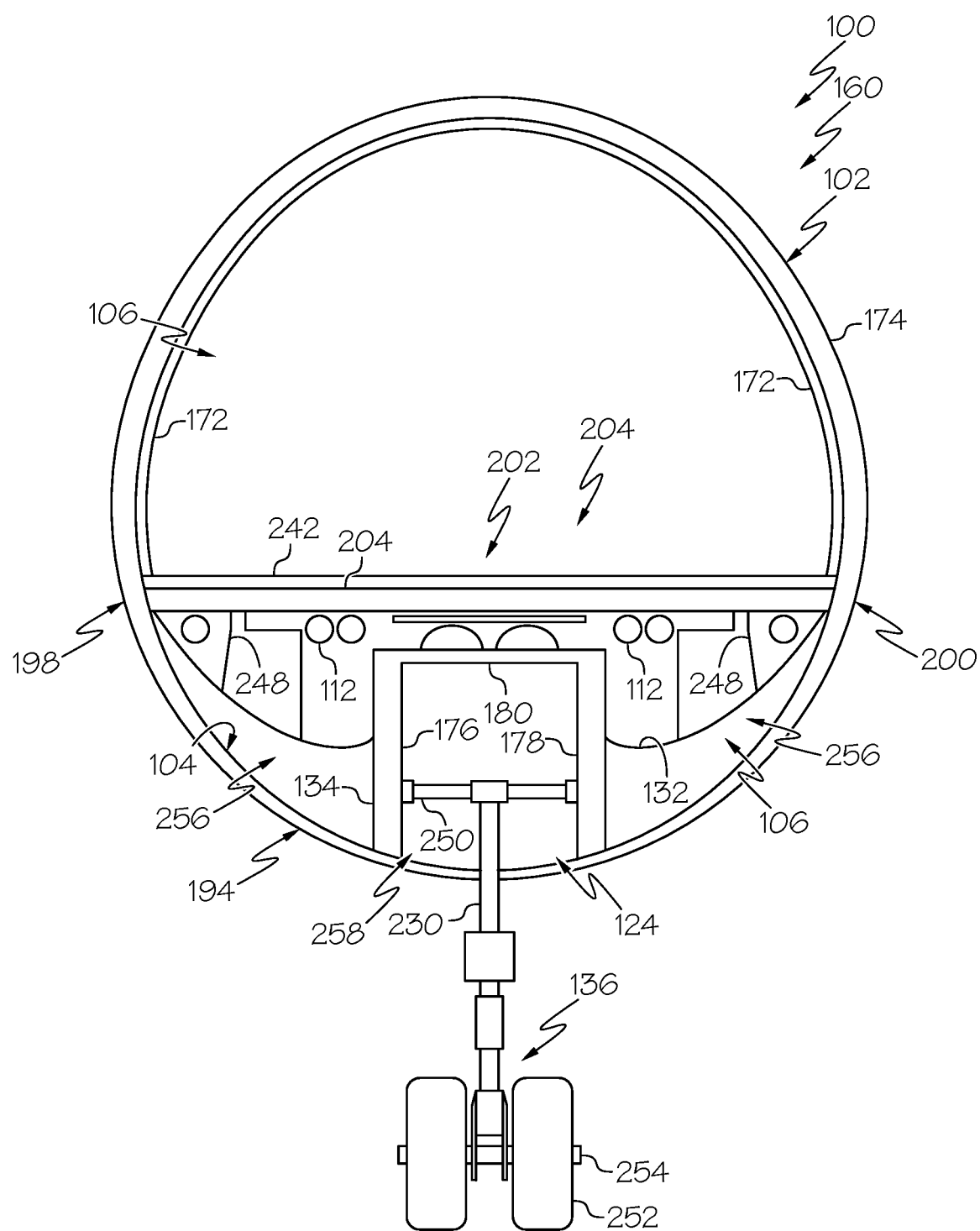
FIG. 5 is a schematic, sectional view of the nose structure of the aircraft, on line 5-5 of FIG. 3.
Figure 6:
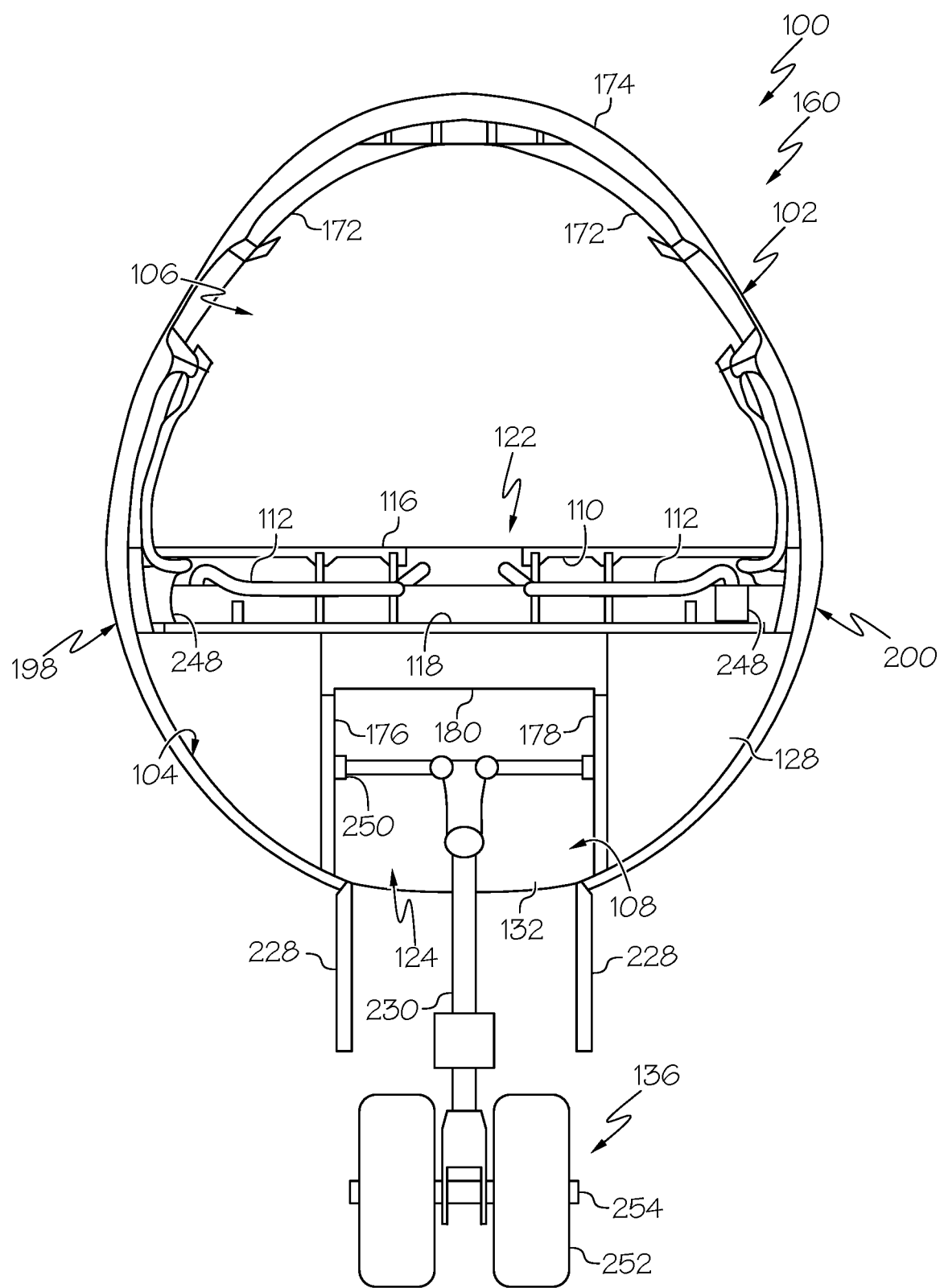
FIG. 6 is a schematic, sectional view of the nose structure of the aircraft, on line 6-6 of FIG. 3.

Referring to FIGS. 3-5, in an example, the passenger deck floor 202 includes a plurality of floor beams 240. The plurality of floor beams 240 run transversely between the right side 198 (FIG. 5) of the airframe 102 to the left side 200 (FIG. 5) of the airframe 102 and are longitudinally spaced apart from each other. A plurality of passenger deck floor panels 242 are supported by and coupled to the plurality of floor beams 240. As illustrated in FIGS. 4 and 5, in an example, a forward portion of the passenger deck floor 202 is supported by the wheel well assembly 194.

Figure 12:
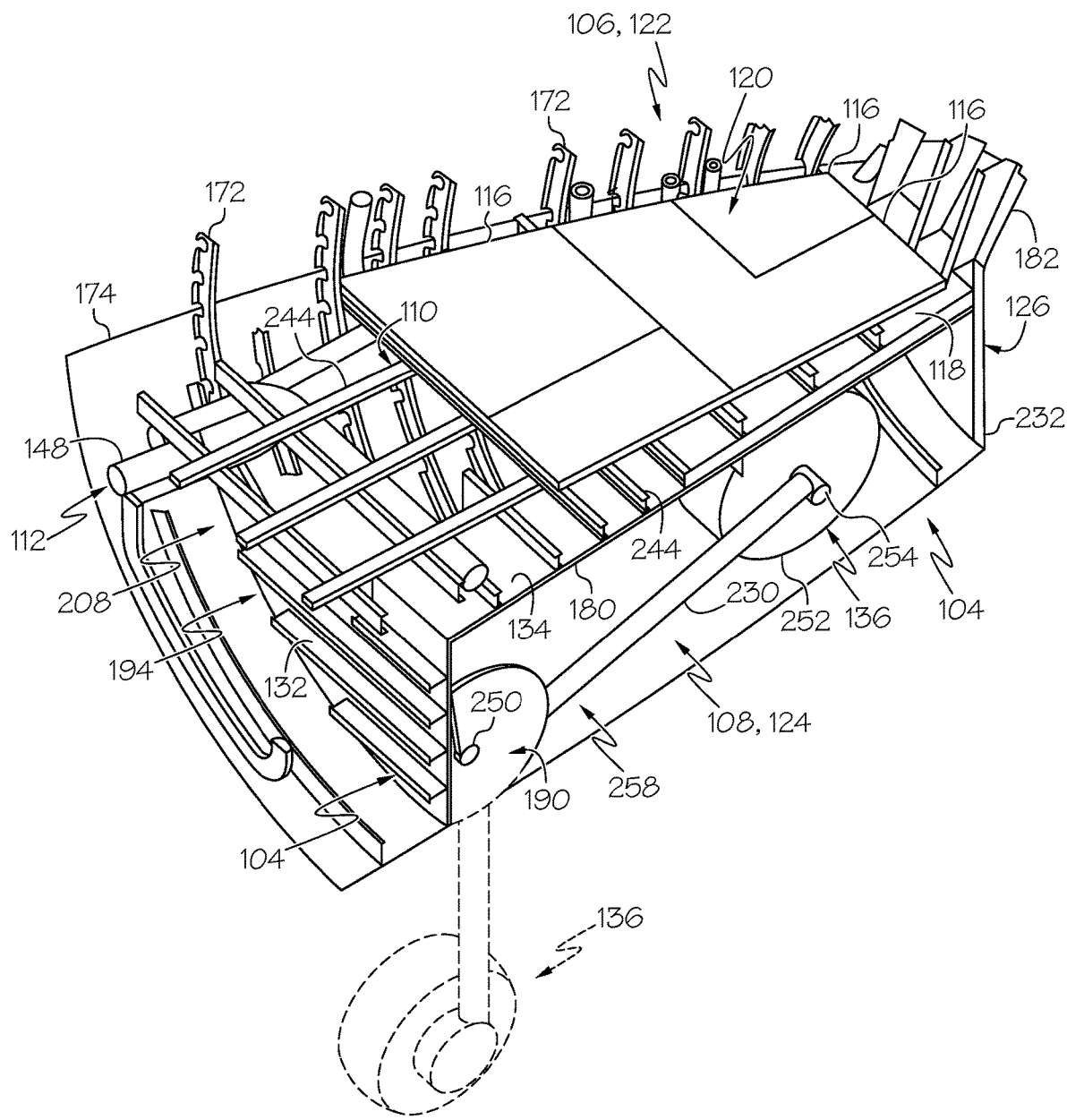
FIG. 12 is a schematic, side perspective, sectional view, in partial cutaway, of the nose structure of the aircraft.
Figure 13:
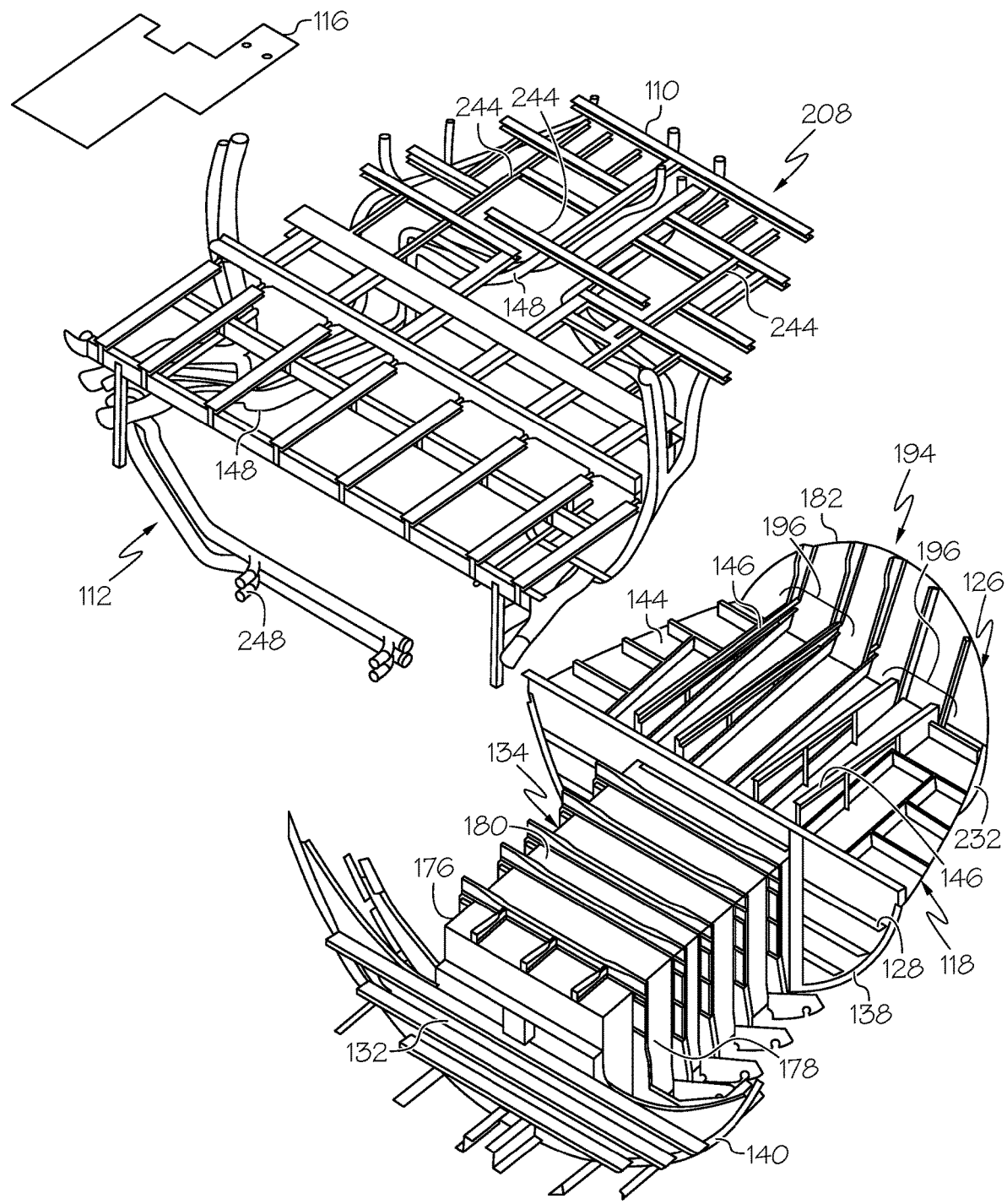
FIG. 13 is a schematic, exploded, top perspective view of an example of the subfloor assembly and the wheel well assembly of the aircraft.
Figure 14:
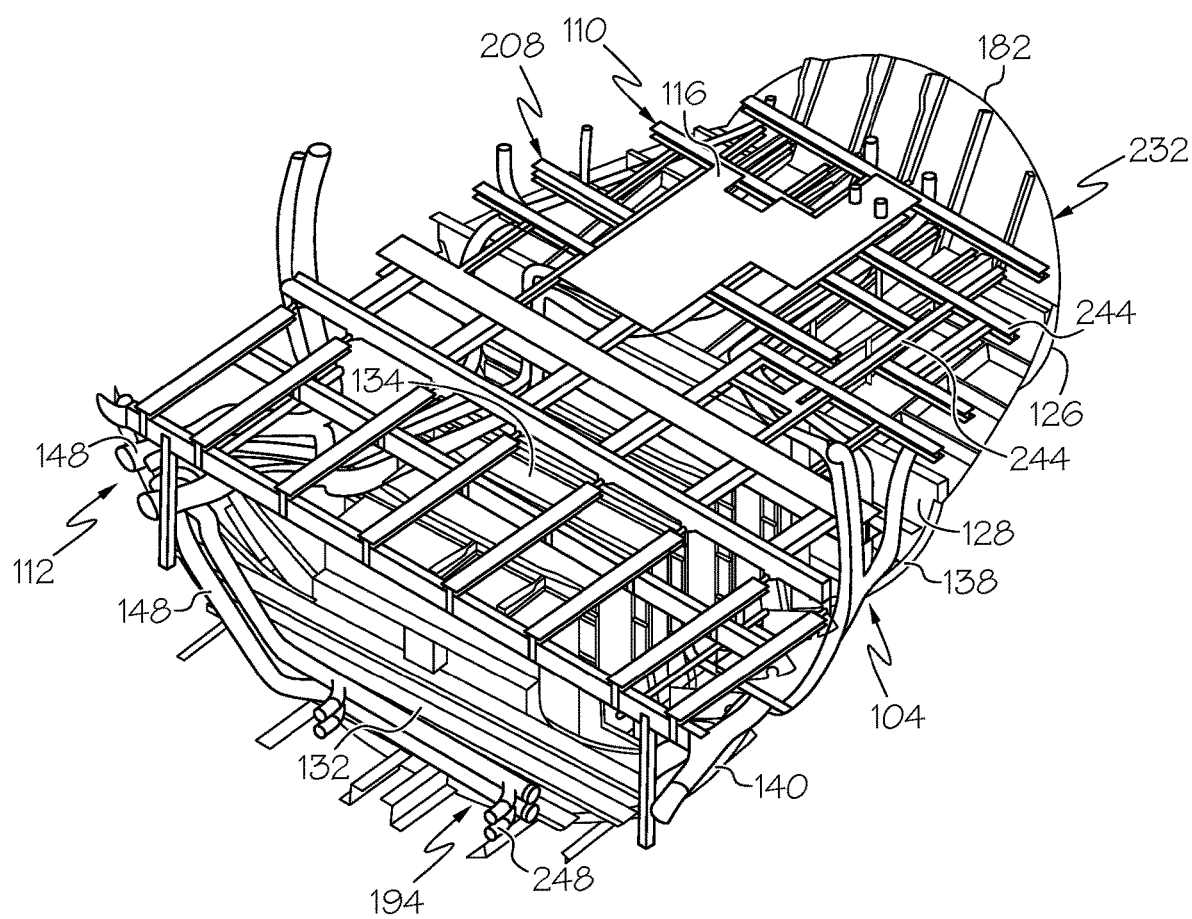
FIG. 14 is a schematic, top perspective view of an example the subfloor assembly and the wheel well assembly of the aircraft.

Referring generally to FIGS. 2-4 and 8, and particularly to FIGS. 12-14, in an example, the plurality of transport elements 112 is coupled to the floor-panel support 110 to form a subfloor assembly 208. The subfloor assembly 208 is coupled to the pressure deck 118 within the airframe 102.

Thus, in an example, assembly of the floor-panel support 110 and coupling of the plurality of transport elements 112 to the floor-panel support 110 is performed prior to installation of the subfloor assembly 208 within the airframe 102. The plurality of transport elements 112 and the floor-panel support 110 are constructed as a unitary, or integrated, component (i.e., the subfloor assembly 208) outside of the airframe 102. The subfloor assembly 208 is then transported and installed within the airframe 102 (within the nose structure 160). A layout and/or selection of the plurality of transport elements 112 may be based on a design of the aircraft 100 and/or the high-level systems 114 to which the plurality of transport elements 112 is to be coupled. This approach beneficially improves the cycle time and reduces the costs associated with manufacture of the aircraft 100.

Referring generally to FIGS. 2-4, and particularly to FIGS. 12-14, in an example, the nose structure 160 includes a plurality of floor panels 116. In FIGS. 12-14, only a portion of the plurality of floor panels 116 is shown. The plurality of floor panels 116 is support by and is coupled to the floor-panel support 110. The plurality of floor panels 116 cover the plurality of transport elements 112. At least a portion of the plurality of floor panels 116 is removable from the floor-panel support 110 to access the plurality of transport elements 112 from within the flight deck 122.

Thus, the floor panels 116 serve as finish flooring and form a portion of the flight deck floor 120. Selective removal of a portion of the plurality of floor panels 116 provides access to the plurality of transport elements 112, located between the floor-panel support 110 and the pressure deck 118, through the floor-panel support 110, such as during assembly, inspection, and/or maintenance. This approach beneficially simplifies access to the plurality of transport elements 112, which is accessible from above the pressure deck 118, rather than beneath it, as compared to traditional aircraft design in which transport elements and other operational components are in very confined spaces between the nose landing gear bay and the fuselage. Additionally, selective removal of a portion of the plurality of floor panels 116 also provides access to at least a portion of the wheel well assembly 194 through the floor-panel support 110.

Referring to FIGS. 8,9,13, and 14, in an example, the pressure deck 118 includes a platform 144 and a plurality of support beams 146. The plurality of support beams 146 is coupled to the platform 144. The floor-panel support 110 is supported by and is coupled to the plurality of support beams 146.

Generally, the platform 144 of the pressure deck 118 is a panel structure that is configured to support intended flight deck loads. The pressure deck 118 (e.g., the panel structure) may also include stiffeners. As illustrated in FIG. 13, in an example, the plurality of support beams 146 project vertically upward from a surface of the platform 144 and provide structural support for placement and connection of the floor-panel support 110. The plurality of support beams 146 space the floor-panel support 110 away from the platform 144 to accommodate placement of the plurality of transport elements 112 between the floor-panel support 110 and the platform 144.

Referring to FIGS. 9,13, and 14, in an example, each one of the plurality of support beams 146 extends longitudinally and is transversely spaced apart from an adjacent one of the plurality of support beams 146. A portion of the plurality of transport elements 112 is located between an adjacent pair 196 of the plurality of support beams 146.

As used herein, the terms "longitudinally," "longitudinal," and similar terms refer to being along (e.g., approximately parallel to) the central longitudinal axis 188 (FIGS. 1 and 2) of the aircraft 100. The terms "transversely," "transvers," and similar terms refer to being along (e.g., approximately parallel to) the transverse axis 220 (FIG. 1) of the aircraft 100.

As illustrated in FIGS. 13 and 14, in an example, at least a portion of the plurality of transport elements 112, coupled to an underside of the floor-panel support 110, extends longitudinally along the floor-panel support 110. These longitudinally extending portions of the plurality of transport elements 112 are positioned such that they fit between the adjacent pair 196 (FIG. 13) (e.g., side-by-side pair) of the plurality of support beams 146. For example, a portion of one group of the plurality of transport elements 112 is located between one adjacent pair 196 of the plurality of support beams 146 and a portion of another group of the plurality of transport elements 112 is located between another adjacent pair 196 of the plurality of support beams 146. Any number of the transport elements 112 may be positioned between any adjacent pair 196 of the plurality of support beams 146. As used herein, the phrase "number of" means one or more of a given item. For example, the plurality of transport elements 112 is arranged on, or is laid out relative to, the floor-panel support 110 so that one or more transport elements 112 are positioned between a corresponding adjacent pair 196 of support beams 146. This arrangement reduces the volume required for installation of the plurality of transport elements 112 by essentially locating the plurality of transport elements 112 within the floor 204 of the fuselage 130 (FIGS. 2-4).

Referring generally to FIGS. 5,6, and 8, and particularly to FIGS. 12-14, in an example, the plurality of transport elements 112 includes communication lines 148. The communication lines 148 are used for, or are associated with, at least one of the electrical system 150 (FIG. 1), the hydraulic system 152 (FIG. 1), the environmental system 154 (FIG. 1), the communication system 156 (FIG. 1), the flight control system 222 (FIG. 1), the radar system 224 (FIG. 1), or another one of the high-level systems 114 (FIG. 1) of the aircraft 100.

In an example, the communication lines 148 include electrical lines that transfer electrical power, electrical signals, and/or data between two or more electronic components that are in electrical communication with each other, such as those associated with the electrical system 150, the communication system 156, the flight control system 222, and/or the radar system 224. In another example, the communication lines 148 include hydraulic lines that transfer hydraulic fluid between two or more hydraulic components that are in fluid communication with each other, such as those associated with of the hydraulic system 152. In another example, the communication lines 148 include other types of fluid transfer lines that transfer air, oxygen, or another fluid between two or more environmental components that are in fluid communication with each other, such as those associated with of the environmental system 154.

Figure 7:
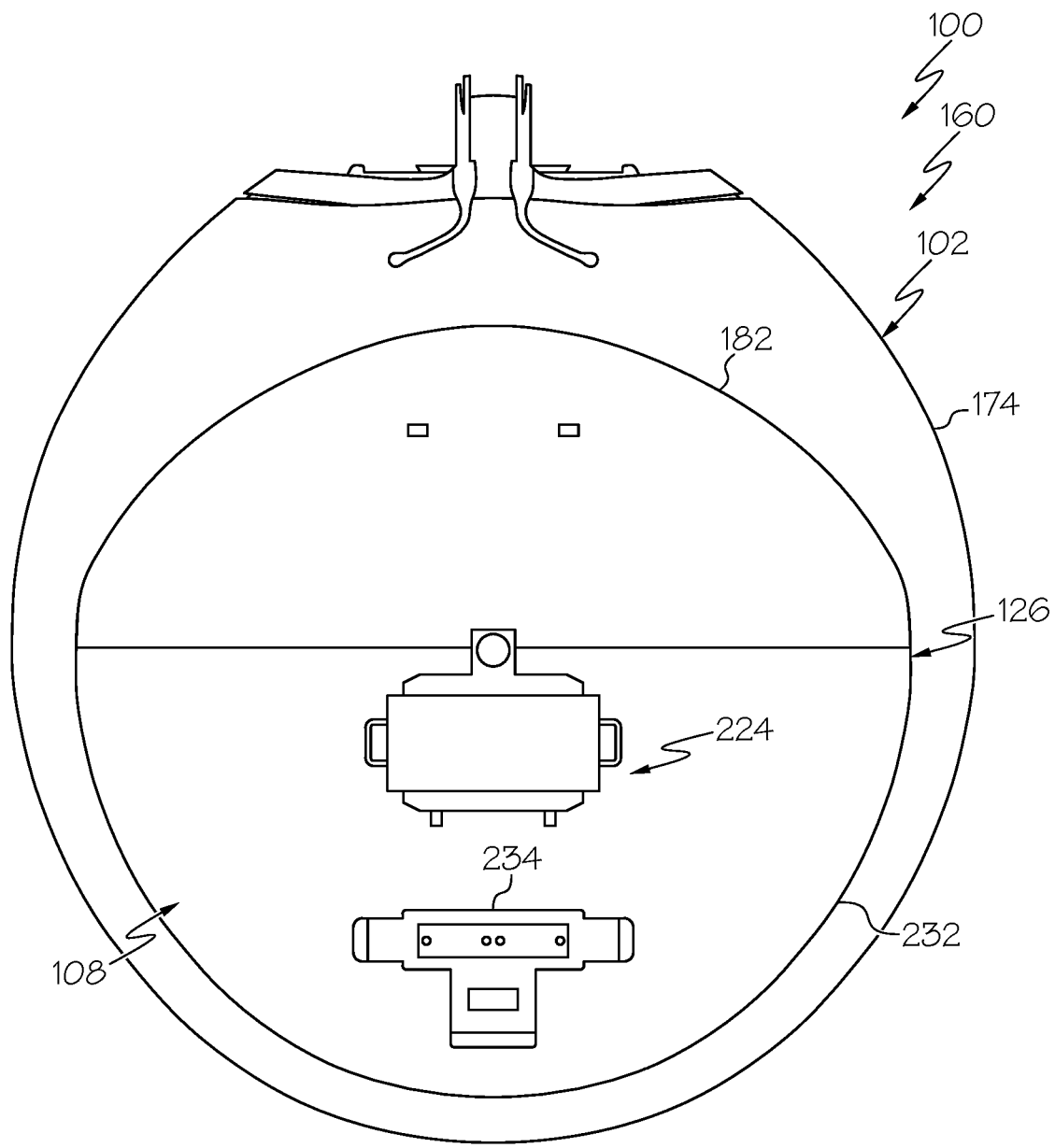
FIG. 7 is a schematic, sectional view of the nose structure of the aircraft, on line 7-7 of FIG. 3.

Referring to FIGS. 2-7 and 9-13, in an example, the wheel well assembly 194 includes a first bulkhead 126 (not shown in FIGS. 5 and 6). The first bulkhead 126 is coupled to the airframe 102 and runs transversely between the right side 198 of the airframe 102 and the left side 200 of the airframe 102, as illustrated in FIG. 7. The first bulkhead 126 forms a portion of the pressure boundary 104. The wheel well assembly 194 also includes a second bulkhead 128 (not shown in FIGS. 5 and 7). The second bulkhead 128 is coupled to the airframe 102 and runs transversely between the right side 198 of the airframe 102 and the left side 200 of the airframe 102, as illustrated in FIG. 6. The second bulkhead 128 forms a portion of the pressure boundary 104. The first bulkhead 126 and the second bulkhead 128 are longitudinally spaced apart from each other. The pressure deck 118 extends between and is coupled to the first bulkhead 126 and the second bulkhead 128, as illustrated in FIGS. 2-4 and 9-11.

Referring to FIGS. 2-5 and 9-13, in an example, the airframe 102 also includes a nose landing gear box 134. The nose landing gear box 134 is coupled with the second bulkhead 128 and the airframe 102. The nose landing gear box 134 forms a portion of the pressure boundary 104. The nose landing gear 136 of the aircraft 100 is mountable within the nose landing gear box 134. In an example, the second bulkhead 128 is configured to react to a load transmitted by the nose landing gear 136 through the nose landing gear box 134. For example, the second bulkhead 128 transfers the load to the external skin 174 and/or the frames 172.

Referring to FIGS. 2-5 and 9-13, in an example, the wheel well assembly 194 includes a third bulkhead 132. The third bulkhead 132 is coupled to the airframe 102 and the nose landing gear box 134 and runs transversely between the right side 198 of the airframe 102 and the left side 200 of the airframe 102, as illustrated in FIG. 5. The third bulkhead 132 forms a portion of the pressure boundary 104. In an example, the third bulkhead 132 is configured to react to the load transmitted by the nose landing gear 136 through the nose landing gear box 134. For example, the third bulkhead 132 transfers the load to the external skin 174 and/or the frames 172.

Figure 10:
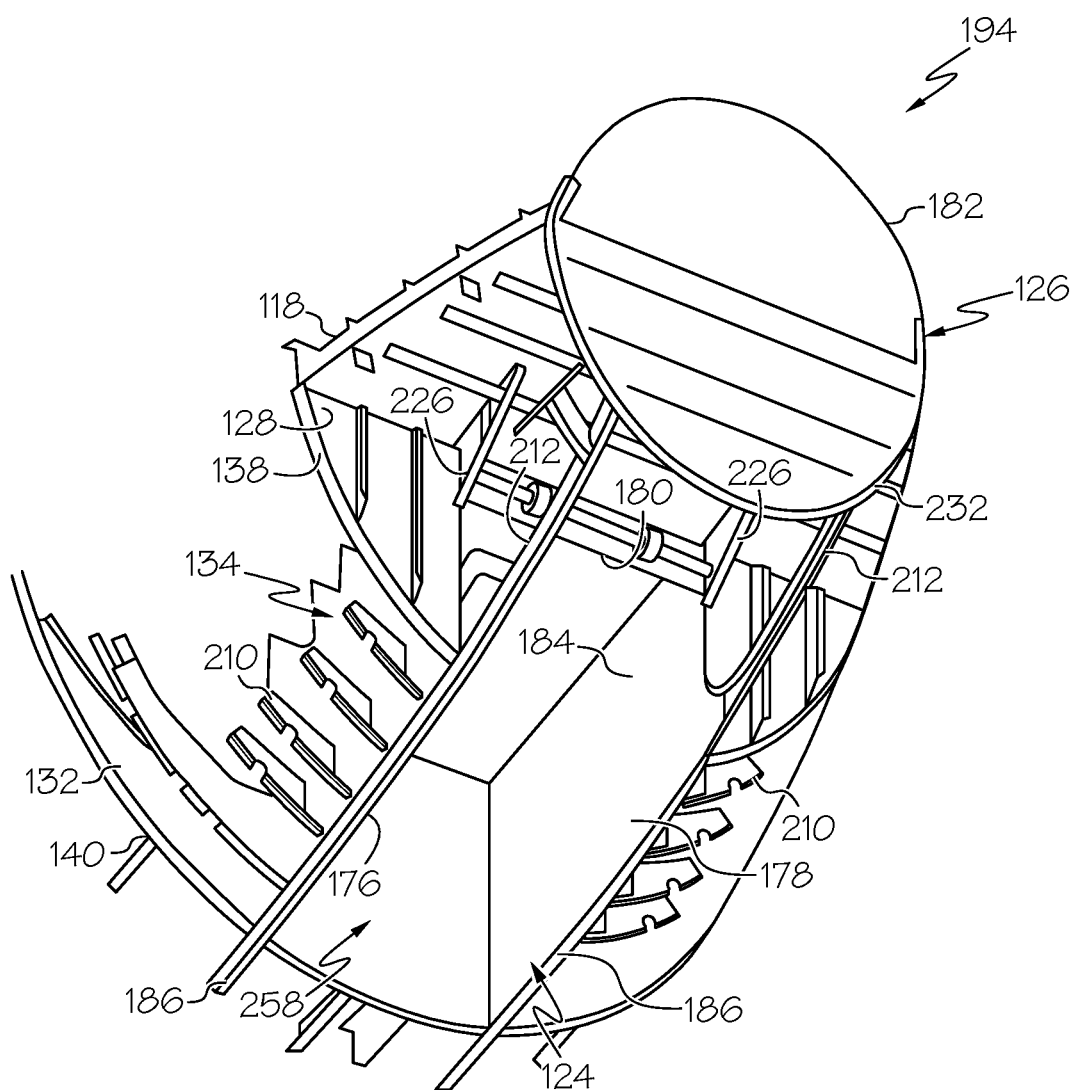
FIG. 10 is a schematic, bottom perspective view of an example of a wheel well assembly of the aircraft.
Figure 11:
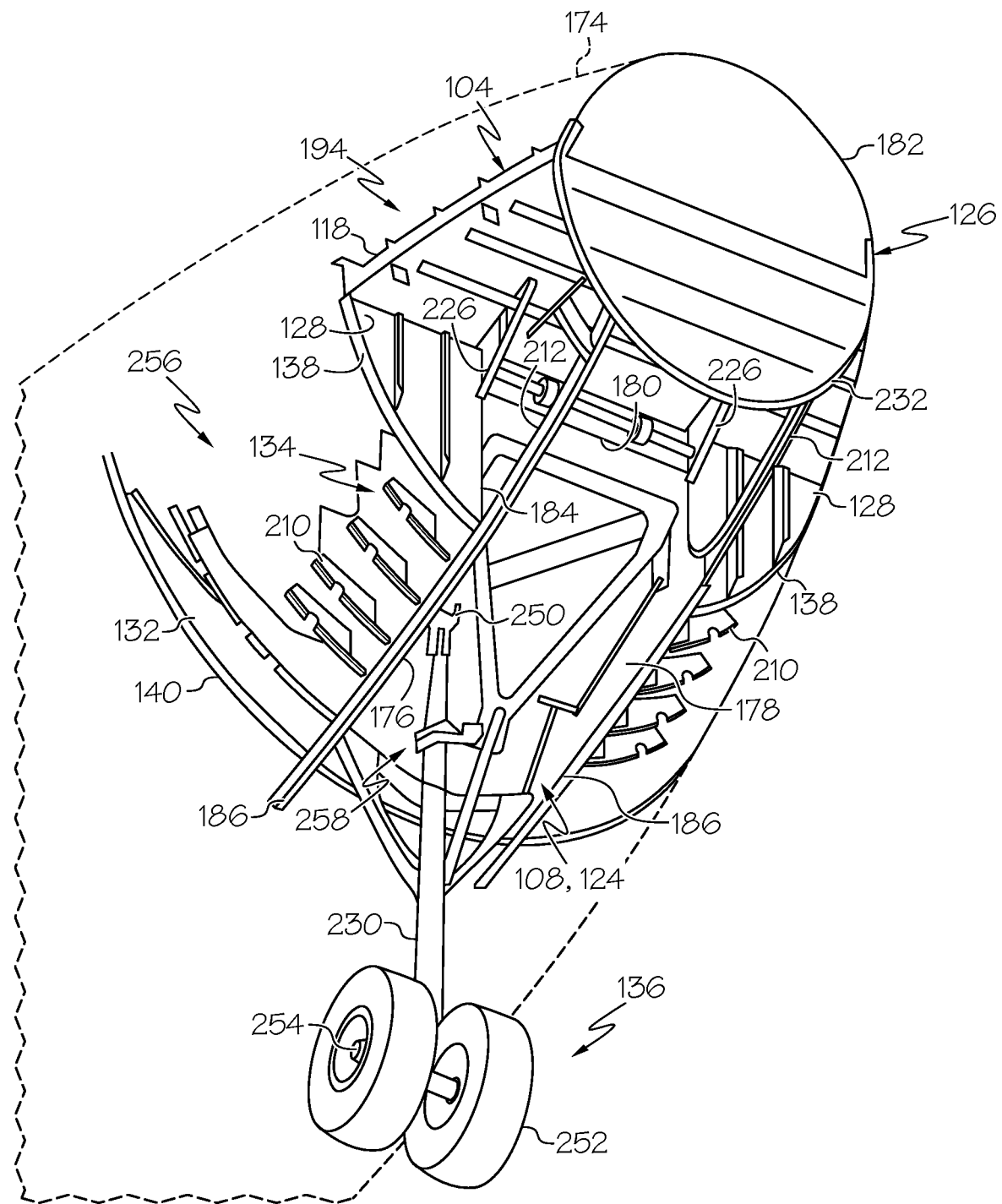
FIG. 11 is schematic, bottom perspective view of an example of the nose structure of the aircraft.

Referring generally to FIGS. 2-6 and 9 and particularly to FIGS. 10-12, in an example, the nose landing gear box 134 is a three-sided structure. The nose landing gear box 134 is located aft of the second bulkhead 128. The nose landing gear box 134 includes a first sidewall 176. The first sidewall 176 is coupled to the airframe 102, the second bulkhead 128, and the third bulkhead 132. The first sidewall 176 runs longitudinally between the third bulkhead 132 and the second bulkhead 128. The first sidewall 176 forms a portion of the pressure boundary 104. The nose landing gear box 134 also includes a second sidewall 178. The second sidewall 178 is coupled to the airframe 102, the second bulkhead 128, and the third bulkhead 132. The second sidewall 178 runs longitudinally between the third bulkhead 132 and the second bulkhead 128 and is transversely spaced away from the first sidewall 176. The second sidewall 178 forms a portion of the pressure boundary 104. The nose landing gear box 134 further includes a top wall 180. The top wall 180 extends between and is coupled to the first sidewall 176, the second sidewall 178, the third bulkhead 132, and the second bulkhead 128. The top wall 180 forms a portion of the pressure boundary 104.

In an example, each one of the first bulkhead 126, the second bulkhead 128, and/or the third bulkhead 132 is a panel structure that is configured to support intended loads. Each one of the first bulkhead 126, the second bulkhead 128, and/or the third bulkhead 132 (e.g., the panel structures) may also include stiffeners.

In an example, each one of the first sidewall 176, the second sidewall 178, and/or the top wall 180 is a panel structure that is configured to support intended loads. Each one of the first sidewall 176, the second sidewall 178, and/or the top wall 180 (e.g., the panel structures) may also include stiffeners.

In an example, the pressure deck 118 is coupled to and is sealed to the airframe 102, the first bulkhead 126, and the second bulkhead 128. A portion of the pressure boundary 104 is formed by the sealed connection between the pressure deck 118 and the airframe 102 (e.g., the external skin 174 of the airframe 102). A portion of the pressure boundary 104 is formed by the sealed connection between the pressure deck 118 and the first bulkhead 126. A portion of the pressure boundary 104 is formed by the sealed connection between the pressure deck 118 and the second bulkhead 128. Accordingly, the pressure deck 118 is pressurized and serves as a pressure barrier between the pressurized space 106, located above the pressure deck 118, and the non-pressurized space 108, located below the pressure deck 118.

In an example, the first bulkhead 126 includes a lower portion 232 and an upper portion 182. The lower portion 232 of the first bulkhead 126 is coupled to the airframe 102 but is not sealed to the airframe 102. The upper portion 182 of the first bulkhead 126 is coupled to and is sealed to the airframe 102. The pressure deck 118 is coupled to and is sealed to the upper portion 182 of the first bulkhead 126. A portion of the pressure boundary 104 is formed by the sealed connection between the upper portion 182 of the first bulkhead 126 and the airframe 102 (e.g., the external skin 174 of the airframe 102). A portion of the pressure boundary 104 is formed by the sealed connection between the pressure deck 118 and the upper portion 182 of the first bulkhead 126. Accordingly, the upper portion 182 of the first bulkhead 126 is pressurized and serves as a pressure barrier between the pressurized space 106, located aft of the upper portion 182, and the non-pressurized space 108, located forward of upper portion 182. The lower portion 232 of the first bulkhead 126 is not pressurized and does not serve as a pressure barrier between the non-pressurized space 108, located aft of the lower portion 232, and the non-pressurized space 108, located forward of the lower portion 232.

In an example, the second bulkhead 128 is coupled to and is sealed to the airframe 102 and the pressure deck 118. A portion of the pressure boundary 104 is formed by the sealed connection between the second bulkhead 128 and the airframe 102 (e.g., the external skin 174 of the airframe 102). Accordingly, the second bulkhead 128 is pressurized and serves as a pressure barrier between the pressurized space 106, located aft of the second bulkhead 128, and the non-pressurized space 108, located forward of the second bulkhead 128.

In an example, the third bulkhead 132 is coupled to and is sealed to the airframe 102. A portion of the pressure boundary 104 is formed by the sealed connection between the third bulkhead 132 and the airframe 102 (e.g., the external skin 174 of the airframe 102). Accordingly, the third bulkhead 132 is pressurized and serves as a pressure barrier between the pressurized space 106, located aft of the second bulkhead 128, and the non-pressurized space 108, located forward of the third bulkhead 132.

In an example, the nose landing gear box 134 is coupled to and is sealed to the second bulkhead 128, the third bulkhead 132, and the airframe 102. A portion of the pressure boundary 104 is formed by the sealed connection between the nose landing gear box 134 and the second bulkhead 128. A portion of the pressure boundary 104 is formed by the sealed connection between the nose landing gear box 134 and the third bulkhead 132. A portion of the pressure boundary 104 is formed by the sealed connection between the nose landing gear box 134 and the airframe 102 (e.g., the external skin 174 of the airframe 102). Accordingly, the nose landing gear box 134 is pressurized and serves as a pressure barrier between the pressurized space 106, located outside of the nose landing gear box 134, and the non-pressurized space 108, located inside of the nose landing gear box 134.

In an example, an interior space 258 (FIGS. 10 and 11) of the nose landing gear box 134 (formed between the first sidewall 176, the second sidewall 178, and the top wall 180) forms a portion of the nose landing gear bay 124 and is located in the non-pressurized space 108. The nose landing gear 136 is coupled to the nose landing gear box 134 within the interior space 258, as illustrated in FIGS. 3, 4, and 11. A portion of nose landing gear 136 is stowed within the nose landing gear box 134 when the nose landing gear 136 is retracted, as illustrated in FIGS. 4 and 12.

In an example, an interior volume 256 (FIGS. 5 and 11) of the aircraft 100, located outside of the nose landing gear box 134, between the nose landing gear box 134 and the airframe 102, and between the second bulkhead 128 and the third bulkhead 132 is in the pressurized space 106.

In an example, the first sidewall 176 of the nose landing gear box 134 is coupled to and is sealed to the airframe 102, the second bulkhead 128, and the third bulkhead 132. A portion of the pressure boundary 104 is formed by the sealed connection between the first sidewall 176 and second bulkhead 128. A portion of the pressure boundary 104 is formed by the sealed connection between the first sidewall 176 and the third bulkhead 132. A portion of the pressure boundary 104 is formed by the sealed connection between the first sidewall 176 and the airframe 102 (e.g., the external skin 174 of the airframe 102). Accordingly, the first sidewall 176 is pressurized and serves as a pressure barrier between the pressurized space 106, located outboard of the first sidewall 176, and the non-pressurized space 108, located inboard of the first sidewall 176.

In an example, the second sidewall 178 of the nose landing gear box 134 is coupled to and is sealed to the airframe 102, the second bulkhead 128, and the third bulkhead 132. A portion of the pressure boundary 104 is formed by the sealed connection between the second sidewall 178 and second bulkhead 128. A portion of the pressure boundary 104 is formed by the sealed connection between the second sidewall 178 and the third bulkhead 132. A portion of the pressure boundary 104 is formed by the sealed connection between the second sidewall 178 and the airframe 102 (e.g., the external skin 174 of the airframe 102). Accordingly, the second sidewall 178 is pressurized and serves as a pressure barrier between the pressurized space 106, located outboard of the second sidewall 178, and the non-pressurized space 108, located inboard of the second sidewall 178.

In an example, the top wall 180 of the nose landing gear box 134 is coupled to and is sealed the second bulkhead 128, the third bulkhead 132, the first sidewall 176, and the second sidewall 178. A portion of the pressure boundary 104 is formed by the sealed connection between the top wall 180 and second bulkhead 128. A portion of the pressure boundary 104 is formed by the sealed connection between the top wall 180 and the third bulkhead 132. A portion of the pressure boundary 104 is formed by the sealed connection between the top wall 180 and the first sidewall 176. A portion of the pressure boundary 104 is formed by the sealed connection between the top wall 180 and the second sidewall 178. Accordingly, the top wall 180 is pressurized and serves as a pressure barrier between the pressurized space 106, located above the top wall 180, and the non-pressurized space 108, located below the top wall 180.

Referring to FIGS. 2-4 and 7-14, in an example, the first bulkhead 126 is oriented vertically and is coupled to the external skin 174 of the airframe 102 and the pressure deck 118 to form a portion of the pressure boundary 104. In an example, the first bulkhead 126 is coupled to (e.g., is tied in with) one or more of the frames 172 (FIG. 1) of the airframe 102. The first bulkhead 126 is located at a forwardmost position on the wheel well assembly 194.

In an example, the lower portion 232 of the first bulkhead 126 is oriented vertically and extends from the airframe 102 to the pressure deck 118 and partially delimits the nose landing gear bay 124. In an example, the pressure deck 118 is coupled to the first bulkhead 126 about an intersection of the lower portion 232 and the upper portion 182. The upper portion 182 projects from the pressure deck 118.

In an example, the upper portion 182 of the first bulkhead 126 slopes upwardly and forwardly from the pressure deck 118 toward the forward end of the nose structure 160 (e.g., is canted relative to the lower portion 232 of the first bulkhead 126). This upward and forward sloped configuration of the upper portion 182 of the first bulkhead 126 provides improved ability of the first bulkhead 126 to withstand the energy of an impact with an airborne object, such as a bird strike. For example, the angle of the upper portion 182 with respect to a horizontal plane (e.g., the XY-plane) enables the first bulkhead 126 to it deflect the object downward so that the nose structure 160 receives a glancing blow, thereby not absorbing the entire impact energy. This upward and forward sloped configuration also enables the flight deck 122 (FIG. 3) to sit farther forward, thereby reducing the cross-sectional size of the nose structure 160 and/or shortening a length of the nose structure 160.

In an example, the upper portion 182 of the first bulkhead 126 is disposed at a non-zero angle with respect to the XY-plane. In an example, the angle of the upper portion 182 with respect to the XY-plane is approximately forty-five degrees. In another example, the angle of the upper portion 182 with respect to the XY-plane is less than approximately forty-five degrees.

Referring to FIG. 4, in an example, the nose of the aircraft 100 includes a radome 192 that is coupled to the airframe 102 at the forward end of the aircraft 100. The radome 192 houses certain components of the aircraft 100, such as one or more components of the radar system 224 (FIG. 1). In an example, one or more components of the radar system 224, such as at least one antenna 234 (FIGS. 4, 7, and 8) associated with a weather radar system, a glideslope landing system, and/or a localizer system, are coupled to a forward-facing surface of the lower portion 232 of the first bulkhead 126, behind the radome 192. In an example, an interior volume of the radome 192, forward of the first bulkhead 126 is in the non-pressurized space 108.

Referring to FIGS. 2-4, 6, and 9-11, in an example, the second bulkhead 128 is oriented vertically and is coupled to the external skin 174 of the airframe 102 and the pressure deck 118 to form a portion of the pressure boundary 104. In an example, the second bulkhead 128 is coupled to (e.g., is tied in with) one or more of the frames 172 (FIG. 1) of the airframe 102. The second bulkhead 128 is located aft of the first bulkhead 126.

Referring to FIGS. 2-5 and 9-11, in an example, the third bulkhead 132 is oriented vertically and is coupled to the external skin 174 of the airframe 102 to form a portion of the pressure boundary 104. In an example, the third bulkhead 132 is coupled to (e.g., is tied in with) one or more of the frames 172 (FIG. 1) of the airframe 102. The third bulkhead 132 is located aft of the second bulkhead 128.

Referring to FIGS. 5, 9-11, and 13, in an example, the first sidewall 176 is oriented vertically and is coupled to the external skin 174 of the airframe 102 to form a portion of the pressure boundary 104. The second sidewall 178 is oriented vertically and is coupled to the external skin 174 of the airframe 102 to form a portion of the pressure boundary 104. In an example, the first sidewall 176 and the second sidewall 178 are coupled to (e.g., are tied in with) one or more of the frames 172 (FIG. 1) of the airframe 102. In an example, the wheel well assembly 194 includes frame splices 210 (FIGS. 10 and 11) coupled to each one of the first sidewall 176 and the second sidewall 178 and to corresponding ones of the frames 172 (FIG. 2).

Referring generally to FIGS. 3-7, and particularly to FIGS. 10 and 11, in an example, an aft end of each one of the first sidewall 176, the second sidewall 178, and the top wall 180 is coupled to the third bulkhead 132 and forms a portion of the pressure boundary 104. Thus, the third bulkhead 132 forms a rear wall, or aft wall, that encloses an aft end of the nose landing gear box 134. A forward end of each one of the first sidewall 176, the second sidewall 178, and the top wall 180 is coupled to the second bulkhead 128 and forms a portion of the pressure boundary 104. The second bulkhead 128 includes an opening 184 (FIGS. 10 and 11). The forward ends of the first sidewall 176, the second sidewall 178, and the top wall 180 surround a perimeter of the opening 184. The opening 184 accommodates a portion of the nose landing gear 136 when retracted into the nose landing gear bay 124.

Referring to FIG. 4, in an example, a portion (e.g., an aft portion) of the floor-panel support 110 is supported by the nose landing gear box 134. For example, a portion of the floor-panel support 110 is supported by the top wall 180 of the nose landing gear box 134. In an example, the nose structure 160 includes at least one stanchion 216. The stanchion 216 is coupled to the top wall 180 and the floor-panel support 110.

Referring generally to FIGS. 3-7, and particularly to FIGS. 10 and 11, in an example, the nose landing gear box 134 is coupled to the pressure deck 118. The pressure deck 118 is configured to react to the load transmitted by the nose landing gear 136 through the nose landing gear box 134. For example, the pressure deck 118 transfers the load to the external skin 174 and/or the frames 172.

Referring to FIGS. 10 and 11, in an example, the wheel well assembly 194 includes gussets 226 coupled to the nose landing gear box 134 and the pressure deck 118. In an example, the gussets 226 extend through the opening 184 of the second bulkhead 128.

Referring generally to FIGS. 2-6 and 9, and particularly to FIGS. 10-12, in an example, the top wall 180 of the nose landing gear box 134 is coupled to the pressure deck 118. This configuration facilitates a more effective load transfer from the nose landing gear box 134 to the pressure deck 118. In an example, the top wall 180 and the pressure deck 118 share a common virtual plane 214, as illustrated in FIG. 2.

Referring to FIGS. 2-4, in an example, the pressure deck 118 slopes upwardly from the second bulkhead 128 to the first bulkhead 126 with respect to a horizontal plane (e.g., the XY-plane). In an example, the top wall 180 of the nose landing gear box 134 also slopes upwardly from the third bulkhead 132 to the second bulkhead 128 (or the pressure deck 118) with respect to the horizontal plane (e.g., the XY-plane). This upwardly sloping configuration facilitates a reduction in the cross-sectional size, viewed along the central longitudinal axis 188 (FIG. 2), of the nose structure 160 and enables the nose landing gear 136 to be positioned at a higher relative position, closer to the flight deck floor 120, when in the retracted position. This upwardly sloping configuration also provides a drain path for condensation or other fluids.

The present disclosure recognizes that in certain types of aircraft, such as freighter or cargo aircraft, it may be desirable for the aircraft to have a less nose down orientation while on the ground, which in turn orients the floor of the aircraft in a more horizontal orientation and makes moving cargo along the floor in the forward and aft directions easier. One technique for leveling the floor is to increase the length of the nose landing gear, which raises the nose of the aircraft while on the ground. Accordingly, the configuration of the nose structure 160 and, particularly, of the wheel well assembly 194 and, more particularly, of the upward slope of the pressure deck 118 enables the nose structure 160 to accommodate an increase in the length of the nose landing gear 136.

In an example, the pressure deck 118 and/or the top wall 180 of the nose landing gear box 134 is disposed at an acute angle with respect to the XY-plane. In an example, the angle of the pressure deck 118 and/or the top wall 180 with respect to the XY-plane is less than approximately forty-five degrees. In another example, the angle of pressure deck 118 and/or the top wall 180 with respect to the XY-plane is less than approximately thirty-five degrees. In another example, the angle of pressure deck 118 and/or the top wall 180 with respect to the XY-plane is less than approximately twenty-five degrees. In another example, the angle of pressure deck 118 and/or the top wall 180 with respect to the XY-plane is less than approximately fifteen degrees.

In another example (not shown in the Figures), the pressure deck 118 and/or the top wall 180 of the nose landing gear box 134 is horizontal (e.g., is oriented approximately parallel to the XY-pane).

Accordingly, the wheel well assembly 194 and the airframe 102 form the nose landing gear bay 124 and the pressure boundary 104 delimiting the pressurized space 106 and the non-pressurized space 108. The volume, or space, within the wheel well assembly 194 is unpressurized (e.g., forms the non-pressurized space 108). The volume, or space, around the outside of the wheel well assembly 194 is pressurized (e.g., forms the pressurized space 106).

Referring to FIG. 6, in an example, the nose structure 160 also includes nose landing gear bay doors 228. The nose landing gear bay doors 228 are coupled to the airframe 102 and are configured to open and close. When closed, the nose landing gear bay doors 228 enclose the nose landing gear bay 124 and form a portion of a bottom of the fuselage 130. In an example, the nose landing gear bay doors 228 open for deployment and retraction of the nose landing gear 136 and close to stow the nose landing gear 136 within the nose landing gear bay 124 during flight. In another example, the nose landing gear bay doors 228 include a forward set of doors and an aft set of doors. In this example, the forward set of doors are closed when the nose landing gear is fully extended while the aft set of doors remain open.

Referring to FIGS. 10 and 11, in an example, the nose structure 160 also includes a pair of forward door beams 212. The forward door beams 212 run longitudinally and are coupled to the nose landing gear box 134 (e.g., the first sidewall 176 and the second sidewall 178) and to the first bulkhead 126. The forward door beams 212 frame out the nose landing gear bay 124. The nose landing gear bay doors 228 (FIG. 6) are coupled to and supported by the forward door beams 212.

Referring to FIGS. 10, 11, and 13, in an example, the nose structure 160 includes a plurality of load reacting members coupled between the wheel well assembly 194 and the external skin 174 of the airframe 102. In an example, a first load-reacting member 138 is coupled to the second bulkhead 128 and to external skin 174. The first load-reacting member 138 extends along a boundary between the second bulkhead 128 and the external skin 174. The first load-reacting member 138 is configured to transition a load from the second bulkhead 128 to the external skin 174. A second load-reacting member 140 is coupled to the third bulkhead 132 and to the external skin 174. The second load-reacting member 140 extends along a boundary between the third bulkhead 132 and the external skin 174. The second load-reacting member 140 is configured to transition a load from the third bulkhead 132 to the external skin 174 of the fuselage 130. In an example, the first load-reacting member 138 and the second load-reacting member 140 are also coupled to (e.g., tied in with) corresponding ones of the frame 172 of the airframe 102.

In an example, a third load-reacting member 186 is coupled to the nose landing gear box 134 and to the external skin 174. The third load-reacting member 186 extends along a boundary between the first sidewall 176 and the external skin 174 and between the second sidewall 178 and the external skin 174. The third load-reacting member 186 is configured to transition a load from the nose landing gear box 134 to the external skin 174.

Referring generally to FIGS. 1-14, in an example, the disclosed nose structure 160 of the aircraft 100 includes the airframe 102. The airframe 102 includes the pressure deck 118 that forms a portion of the pressure boundary 104 delimiting the pressurized space 106 and the non-pressurized space 108. The nose structure 160 also includes the floor-panel support 110, supported by the pressure deck 118 in the pressurized space 106. The nose structure 160 further includes a plurality of operational components 248 (FIGS. 5, 6, 8, and 12-14), located in the pressurized space 106 between the floor-panel support 110 and the pressure deck 118. The plurality of operational components 248 is associated with at least one high-level system 114 of the aircraft 100.

In an example, the plurality of operational components 248 includes any number of electrical components, mechanical components, hydraulic components, pneumatic components, or other components of the aircraft 100 that are used for or are associated with at least one of the electrical system 150 (FIG. 1), the hydraulic system 152 (FIG. 1), the environmental system 154 (FIG. 1), the communication system 156 (FIG. 1), the flight control system 222 (FIG. 1), the radar system 224 (FIG. 1), or another one of the high-level systems 114 (FIG. 1) of the aircraft 100. In an example, the plurality of operational components 248 includes the plurality of transport elements 112 (e.g., communication lines 148).

In an example, the pressure deck 118 extends from the right side 198 of the airframe 102 to the left side 200 of the airframe 102. The pressure deck 118 and the floor-panel support 110 form a portion of the flight deck floor 120 of the flight deck 122 of the aircraft 100, located in the pressurized space 106. The pressure deck 118 forms a portion of the nose landing gear bay 124 of the aircraft 100, located in the non-pressurized space 108.

In an example, the plurality of operational components 248 is coupled to the floor-panel support 110 to form the subfloor assembly 208. The subfloor assembly 208 is assembled outside of the airframe 102 and is coupled to the pressure deck 118 inside of the airframe 102.

In an example, the nose structure 160 includes the plurality of floor panels 116, supported by the floor-panel support 110 and covering the plurality of operational components 248. At least a portion of the plurality of floor panels 116 is removable from the floor-panel support 110 to access the plurality of operational components 248 from within the flight deck 122.

Referring generally to FIGS. 1-14, also disclosed are examples of the aircraft 100. In an example, the aircraft 100 includes the airframe 102. The airframe 102 forms the nose structure 160 of the aircraft 100. The aircraft 100 also includes at least one high-level system 114 (FIG. 1). The aircraft 100 further includes the wheel well assembly 194, coupled to the airframe 102 and forming a portion of the nose landing gear bay 124. The wheel well assembly 194 includes the pressure deck 118 that extends from the right side 198 of the airframe 102 to the left side 200 of the airframe 102 and that forms a portion of the pressure boundary 104 delimiting the pressurized space 106 and the non-pressurized space 108. The aircraft 100 also includes the floor-panel support 110, supported by the pressure deck 118. The aircraft 100 further includes the plurality of transport elements 112, located between the floor-panel support 110 and the pressure deck 118. The pressure deck 118 and the floor-panel support 110 form a portion of the floor 204 of the aircraft 100 that delimits the flight deck 122, arranged over the floor 204 in the pressurized space 106, and the nose landing gear bay 124, arranged under the floor 204 in the non-pressurized space 108. The plurality of transport elements 112 are associated with the at least one high-level system 114. The plurality of transport elements 112 are accessible from within the flight deck 122.

Referring to FIGS. 12-14, in an example of aircraft 100, the plurality of transport elements 112 is coupled to the floor-panel support 110 to form a subfloor assembly 208. The subfloor assembly 208 is coupled to the pressure deck 118 within the airframe 102.

In an example, the aircraft 100 includes the plurality of floor panels 116, coupled to the floor-panel support 110 and covering the plurality of transport elements 112. At least a portion of the plurality of floor panels 116 is removable from the floor-panel support 110 to access the plurality of transport elements 112 from within the flight deck 122.

Referring to FIGS. 8, 9, 13, and 14, in an example of the aircraft 100, the pressure deck 118 includes the platform 144 and the plurality of support beams 146, coupled to the platform 144. The floor-panel support 110 is supported by and is coupled to the plurality of support beams 146. In an example, each one of the plurality of support beams 146 extends longitudinally and is transversely spaced apart from an adjacent one of the plurality of support beams 146. A portion of the plurality of transport elements 112 is located between the adjacent pair 196 of the plurality of support beams 146.

Referring to FIGS. 9-14, in an example of the aircraft 100, the wheel well assembly 194 includes a first bulkhead 126, coupled with the airframe 102 running transversely between the right side 198 of the airframe 102 and the left side 200 of the airframe 102. The wheel well assembly 194 also includes the second bulkhead 128, coupled with the to the airframe 102 running transversely between the right side 198 of the airframe 102 and the left side 200 of the airframe 102 and longitudinally spaced away from the first bulkhead 126. The wheel well assembly 194 further includes the third bulkhead 132, coupled to the airframe 102 running transversely between the right side 198 of the airframe 102 and the left side 200 of the airframe 102 and longitudinally spaced away from the second bulkhead 128. The wheel well assembly 194 also includes the nose landing gear box 134, coupled to the airframe 102, the second bulkhead 128, and the third bulkhead 132 and extending between the third bulkhead 132 and the second bulkhead 128. The pressure deck 118 extends between and is coupled to the first bulkhead 126 and the second bulkhead 128. The first bulkhead 126, the second bulkhead 128, the third bulkhead 132, and the nose landing gear box 134 form a portion of the pressure boundary 104.

Referring to FIGS. 3, 4, 11, and 12, in an example, the aircraft 100 includes the nose landing gear 136 coupled to the nose landing gear box 134 and stowable within the nose landing gear bay 124.

Referring to FIGS. 3 and 4, in an example, the nose landing gear 136 is mounted within the nose landing gear box 134. The second bulkhead 128 and the third bulkhead 132 react to a load transmitted by the nose landing gear 136 through the nose landing gear box 134.

In an example, the aircraft 100 includes an operating mechanism 190 that is configured to selectively extend (or deploy) the nose landing gear 136 from the nose landing gear bay 124 and selectively retract the nose landing gear 136 into the nose landing gear bay 124. In the illustrated examples, the nose landing gear bay 124 is located at the forward end of the fuselage 130 (in the nose structure 160) under the flight deck 122 and forms the storage compartment for the nose landing gear 136 when the nose landing gear 136 is retracted.

The operating mechanism 190 of the nose landing gear 136 includes various components configured to articulate the nose landing gear 136 between the landing and flight positions. As a combined unit, the operating mechanism 190 and the nose landing gear 136 can withstand the loads and stresses applied during landing, taxiing, towing, and take off, as well as other repeated loads and stresses. Additionally, wheel well assembly 194 (e.g., the nose landing gear box 134, the second bulkhead 128, and the third bulkhead 132) form a combined structure that is strong enough to withstand the loads and stresses transmitted by the nose landing gear 136.

Referring to FIGS. 3-6, in an example, the nose landing gear 136 includes a trunnion 250, coupled to the nose landing gear box 134. The nose landing gear 136 also includes a strut 230, coupled to the trunnion 250. The nose landing gear 136 further includes an axle 254, coupled to the strut 230, opposite to the trunnion 250. The nose landing gear 136 also includes a wheel 252, coupled to the axle 254. With the nose landing gear 136 stowed within the nose landing gear bay 124, the axle 254 is located closer to the central longitudinal axis 188 of the aircraft 100 than the trunnion 250. In other words, with the nose landing gear 136 retracted and stowed within the nose landing gear bay 124, the axle 254 is located higher within the aircraft 100 relative to the trunnion 250 and the nose landing gear 136 is oriented at an upward angle relative to a horizontal plane.

The strut 230 is articulated so as to be able to pivot between a landing position, in which the strut 230 is generally vertical to deploy the nose landing gear 136, and a flight position, in which the strut 230 is generally horizontal to retract the nose landing gear 136 into the nose landing gear bay 124. As illustrated in FIG. 11, in an example, the strut 230 is coupled to the first sidewall 176 and the second sidewall 178 of the nose landing gear box 134 with the trunnion 250 on either side of the nose landing gear box 134. The trunnion 250 provides a pivotable connection between the strut 230 and the nose landing gear box 134. The nose landing gear 136 may also include an over-center locking linkage that is coupled to the nose landing gear box 134 to lock the nose landing gear 136 in the retracted and deployed positions.

Referring to FIGS. 2-4 and 9-14, in an example of the aircraft 100, the pressure deck 118 is coupled to the nose landing gear box 134. In an example of the aircraft 100, the nose landing gear box 134 includes the first sidewall 176, coupled to the airframe 102, the second bulkhead 128, and the third bulkhead 132 running longitudinally between the third bulkhead 132 and the second bulkhead 128. The nose landing gear box 134 also includes the second sidewall 178, coupled to the airframe 102, the second bulkhead 128, and the third bulkhead 132 running longitudinally between the third bulkhead 132 and the second bulkhead 128. The nose landing gear box 134 further includes the top wall 180, extending between and coupled to the first sidewall 176 and the second sidewall 178.

Referring to FIGS. 2-4, in an example of the aircraft 100, the top wall 180 and the pressure deck 118 share the common virtual plane 214. In an example of the aircraft 100, the pressure deck 118 projects upwardly from the second bulkhead 128 to the first bulkhead 126 with respect to the horizontal plane (e.g., the XY-plane).

Referring to FIGS. 1 and 12-14, in an example of the aircraft 100, the at least one high-level system 114 includes at least one of the electrical system 150, the hydraulic system 152, the environmental system 154, the communication system 156, the flight control system 222, and the radar system 224 of the aircraft 100. The plurality of transport elements 112 includes at least one communication line 148 for at least one of the electrical system 150, the hydraulic system 152, the environmental system 154, the communication system 156, the flight control system 222, and the radar system 224 of the aircraft 100.

Referring generally to FIGS. 1-14, also disclosed are examples of the airframe 102 of the aircraft 100. In an example, the airframe 102 includes the external skin 174. The airframe 102 also includes the first bulkhead 126, coupled to the external skin 174 running transversely between the right side 198 of the airframe 102 and the left side 200 of the airframe 102. The airframe 102 further includes the second bulkhead 128, longitudinally spaced away from the first bulkhead 126 and coupled to the external skin 174 running transversely between the right side 198 of the airframe 102 and the left side 200 of the airframe 102. The airframe 102 also includes the pressure deck 118, coupled to the first bulkhead 126, the second bulkhead 128, and the external skin 174 running longitudinally between the first bulkhead 126 and the second bulkhead 128 and running transversely between the right side 198 of the airframe 102 and the left side 200 of the airframe 102. The pressure deck 118, the first bulkhead 126, and the second bulkhead 128 at least partially delimit the pressurized space 106 and the non-pressurized space 108 of the aircraft 100.

Referring to FIGS. 3 and 4, in an example of the airframe 102, the external skin 174, the pressure deck 118, the first bulkhead 126, and the second bulkhead 128 form at least a portion of a stowage compartment 206 of the aircraft 100. The stowage compartment 206 is in the non-pressurized space 108. In an example, the stowage compartment 206 is the nose landing gear bay 124 of the aircraft 100.

Referring to FIGS. 2-4, in an example of the airframe 102, the pressure deck 118 structurally supports at least a portion of the floor 204 of the aircraft 100. In an example, the portion of the floor 204 the floor-panel support 110, supported by the pressure deck 118 in the pressurized space 106. The portion of the floor 204 also includes the plurality of transport elements 112, located between the floor-panel support 110 and the pressure deck 118. The portion of the floor 204 further includes the plurality of floor panels 116 supported by the floor-panel support 110 and covering the plurality of transport elements 112. The plurality of transport elements 112 are associated with at least one high-level system 114 of the aircraft 100. At least a portion of the plurality of floor panels 116 is removable from the floor-panel support 110 to access the plurality of transport elements 112 from within the pressurized space 106.

Referring to FIGS. 12-14, in an example of the airframe 102, the plurality of transport elements 112 is coupled to the floor-panel support 110 to form the subfloor assembly 208. The subfloor assembly 208 is assembled outside of the airframe 102, is installed within the airframe 102, and is coupled to the pressure deck 118.

Referring to FIGS. 1-14, also disclosed are examples of the aircraft 100. The aircraft 100 includes the fuselage 130 and at least one high-level system 114. The aircraft 100 also includes the floor 204. The floor 204 includes a pressure deck 118, coupled to the fuselage 130 and forming at least a portion of the pressure boundary 104 delimiting the pressurized space 106 and the non-pressurized space 108. The floor 204 further includes the floor-panel support 110, supported by the pressure deck 118 in the pressurized space 106. The floor 204 also includes the plurality of transport elements 112, located between the floor-panel support 110 and the pressure deck 118. The plurality of transport elements 112 being in communication with the at least one high-level system 114 of the aircraft 100.

Referring to FIGS. 12-14, in an example of the aircraft 100, the floor 204 includes the plurality of floor panels 116 supported by the floor-panel support 110 and covering the plurality of transport elements 112. At least a portion of the plurality of floor panels 116 is removable from the floor-panel support 110 to access the plurality of transport elements 112 from within the pressurized space 106.

In an example of the aircraft 100, the plurality of transport elements 112 is coupled to the floor-panel support 110 to form the subfloor assembly 208. The subfloor assembly 208 is assembled outside of the fuselage 130, is installed within the fuselage 130, and is coupled to the pressure deck 118.

Referring generally to FIGS. 1-4, and particularly to FIGS. 9-11, in an example, the aircraft 100 includes the first bulkhead 126, coupled to the fuselage 130 transverse to a central longitudinal axis 188 of the fuselage 130 and forming at least a portion of the pressure boundary 104. The aircraft 100 also includes the second bulkhead 128, coupled to the fuselage 130 transverse to the central longitudinal axis 188 of the fuselage 130 and forming at least a portion of the pressure boundary 104. The first bulkhead 126 and the second bulkhead 128 are spaced apart from each other along the central longitudinal axis 188 of the fuselage 130. The pressure deck 118 extends between and is coupled to the first bulkhead 126 and the second bulkhead 128.

Referring generally to FIGS. 1-14, in an example, the aircraft 100 includes the airframe 102 and the wheel well assembly 194, coupled to the airframe 102. The wheel well assembly 194 and the airframe 102 form the nose landing gear bay 124. The aircraft 100 also includes the nose landing gear 136, stowable within the nose landing gear bay 124. The nose landing gear 136 includes the trunnion 250, coupled to the wheel well assembly 194. The nose landing gear 136 also includes the strut 230, coupled to the trunnion 250. The nose landing gear 136 further includes the axle 254, coupled to the strut 230, opposite to the trunnion 250. The nose landing gear 136 also includes the wheel 252, coupled to the axle 254. With the nose landing gear 136 stowed within the nose landing gear bay 124, the axle 254 is located closer to a central longitudinal axis 188 of the aircraft 100 than the trunnion 250.

In an example, the wheel well assembly 194 and the airframe 102 delimit the pressurized space 106 and the non-pressurized space 108 of the aircraft 100. The nose landing gear bay 124 is located in the non-pressurized space 108.

In an example, the wheel well assembly 194 includes the pressure deck 118, coupled to the airframe 102. The pressure deck 118 extends from the right side 198 of the airframe 102 to the left side 200 of the airframe 102 and slopes upwardly with respect to a horizontal plane in a forward direction. The wheel well assembly 194 also includes the nose landing gear box 134, coupled to the pressure deck 118 and the airframe 102. The nose landing gear box 134 extends from the pressure deck 118 in a rearward direction. The trunnion 250 of the nose landing gear 136 is coupled to the nose landing gear box 134. With the nose landing gear 136 stowed within the nose landing gear bay 124, the wheel 252 of the nose landing gear 136 is located adjacent to the pressure deck 118.

In an example, the aircraft 100 includes the floor-panel support 110, coupled to the pressure deck 118 in the pressurized space 106. The pressure deck 118 and the floor-panel support 110 form a portion of the flight deck floor 120 of the flight deck 122 of the aircraft 100. The aircraft 100 also includes the plurality of operational components 248, located between the floor-panel support 110 and the pressure deck 118.

Accordingly, the examples of the nose structure 160, the airframe 102, and the aircraft 100 described herein combine, or integrate, the wheel well assembly 194, forming the nose landing gear bay 124 and delimiting the pressure boundary 104, and the floor-panel support 110 to form the floor 204 of the fuselage 130 and, more particularly, the flight deck floor 120 between the flight deck 122 and the nose landing gear bay 124. Further, the examples of the nose structure 160, the airframe 102, and the aircraft 100 described herein locate at least a portion of the plurality of transport elements 112 within the flight deck floor 120, between the floor-panel support 110 and the wheel well assembly 194. This configuration of the nose structure 160, the airframe 102, and the aircraft 100 reduces the overall volume required by the forward portion of the fuselage 130 to accommodate the nose landing gear 136 (in the retracted, flight position) and the plurality of transport elements 112.

This configuration also provides a unique geometry for the nose structure 160 and, more particularly, the loft shape of the nose structure 160. Loft shapes of the nose structure of the fuselage are typically described in terms of length divided by diameter (LID). The LID is directly related to the aerodynamic performance of the aircraft, particularly as speed increases. Generally, it is desirable that the loft shape be as circular as possible. The examples of the nose structure 160, the airframe 102, and the aircraft 100 described herein enables an increase in the rate of change of a loft angle 142 (FIG. 2) and a reduction in the overall surface area (wetted area) of the nose structure 160 of the fuselage 130.

As an example, the cross-sectional size of the nose structure 160 is reduced compared to traditional fuselage design. As another example, the loft angle 142 of a loft surface 236 (FIG. 2) of the nose structure 160, extending from a keel 238 (FIG. 2) of the fuselage 130 to the tip 218 of the nose of the fuselage 130, has a faster rate of change. In the illustrative examples, the loft angle 142 of the nose structure 160 changes from about zero degrees at the keel 238 of the fuselage 130 to about ninety degrees at the tip 218 of the nose over a shorter longitudinal distance compared to traditional fuselage design. Additionally, the configurations disclosed herein enables the tip 218 of the nose structure 160 (e.g., the farthest point forward of the fuselage 130) to be located at a closer linear distance to the central longitudinal axis 188 (extending through a centroid of the cylindrical barrel section 246 of the fuselage 130 of the aircraft 100) (FIG. 1), which essentially lifts the nose of the fuselage 130 and reduces drag on the aircraft 100 compared to traditional fuselage design.

Furthermore, combining, or integrating, the floor-panel support 110 and the plurality of transport elements 112 enables the plurality of transport elements 112 to be laid out on the floor-panel support 110 prior to installation of the subfloor assembly 208 within the aircraft 100. In this way, large components of the aircraft 100 can be built outside of the airframe 102 and then installed, which reduces manufacturing time and cost. The disclosed configuration also enables the plurality of transport elements 112 to be in the pressurized space 106, within the flight deck floor 120 and under the flight deck 122. In this way, the transport elements 112 remain easily accessible, both during flight and when the aircraft 100 is on the ground, compared to the limited space provided for this area in traditional fuselage design that is extremely difficult to access during installation, maintenance, and/or inspection of the various systems located in this area.

In various examples, the components of the disclosed nose structure 160, airframe 102, and aircraft 100 may be made of any suitable materials. In an example, the floor-panel support 110 is made of aluminum. In an example, the pressure deck 118 is made of a composite. In an example, the first bulkhead 126 is made of aluminum. In an example, the second bulkhead 128 is made of a composite. In an example, the third bulkhead 132 is made of aluminum. In an example, the first load-reacting member 138, the second load-reacting member 140, and the third load-reacting member 186 (e.g., the chords) are made of titanium.

In another example, the floor-panel support 110 is made of a composite. Using aluminum over composite for the floor-panel support 110 provides an additional benefit in electrical current return networks and is less costly than composite. Using composite over aluminum provides reduced overall weight.

In another example, the pressure deck 118 and the second bulkhead 128 are made of aluminum. Composites may be selected for the pressure deck 118 and the second bulkhead 128 for maintenance considerations and weight, as well as coefficient of thermal similarity to the external skin 174 of the fuselage 130, for example, when the external skin 174 is made of a composite.

In another example, the first bulkhead 126 and the third bulkhead 132 are made of a composite. Aluminum may be selected for the first bulkhead 126 due to its ability to absorb the energy of a bird impact. For example, a first bulkhead 126 made of aluminum may be more likely to absorb an impact and deform as opposed to a first bulkhead 126 made of composite, which may have less damage tolerance. Aluminum may be selected for the third bulkhead 132 due to the large amounts of localized high loading around the nose landing gear box 134.

In another example, one or more of the first load-reacting member 138, the second load-reacting member 140, and the third load-reacting member 186 are made of a composite. Titanium may be selected for the first load-reacting member 138, the second load-reacting member 140, and the third load-reacting member 186 due to its high strength to weight ratios, fatigue performance, coefficient of thermal contraction, and the corrosion isolation it provides between aluminum and composite structure.

Figure 15:
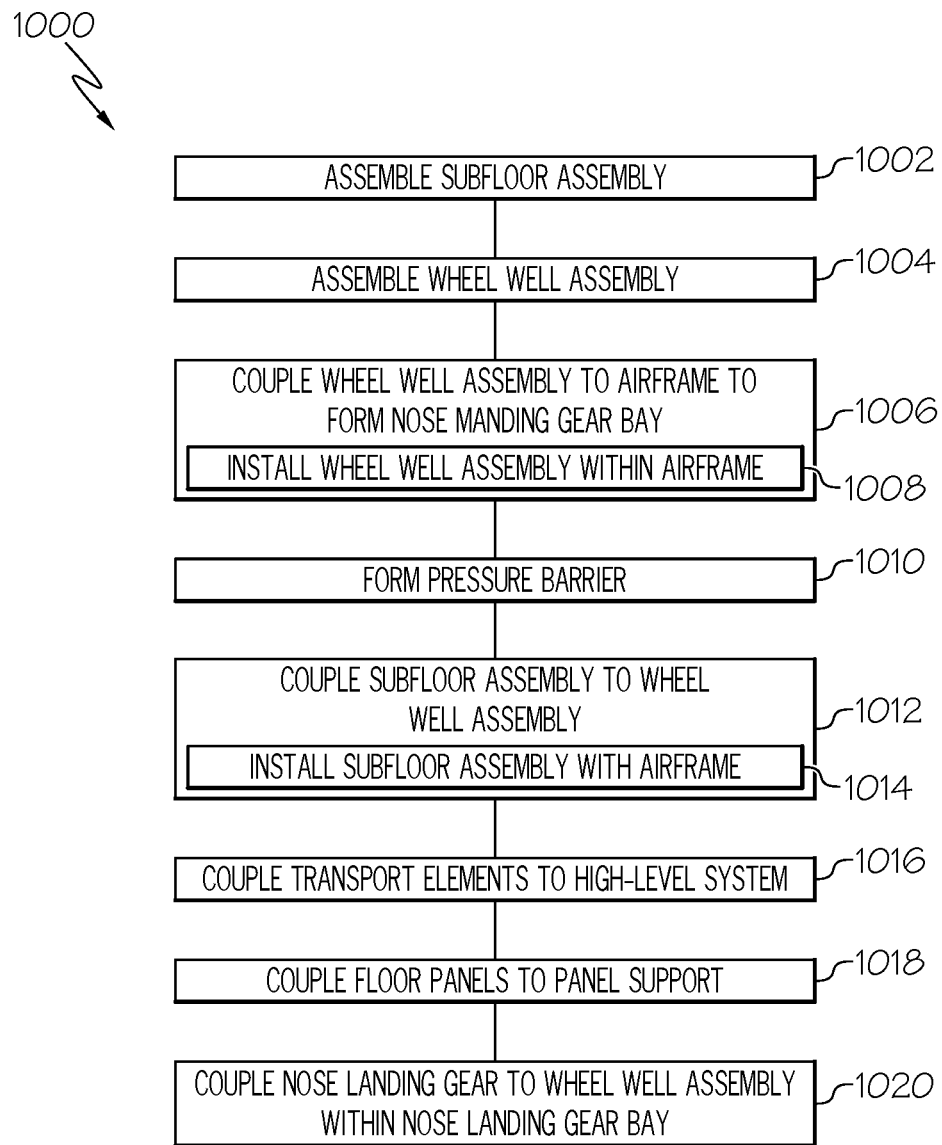
FIG. 15 is a flow diagram of an example of a method for making an aircraft.

FIG. 15 is a flow diagram of an example of a method 1000. In some examples, the method 1000 is applicable to making the aircraft 100 described herein. In some examples, the method 1000 is similarly applicable to making the nose structure 160 and/or the airframe 102 described herein.

Referring generally to FIGS. 1-14 and particularly to FIG. 15, in an example, the method 1000 includes a step of (block 1002) assembling the subfloor assembly 208. The subfloor assembly 208 includes the floor-panel support 110 and the plurality of transport elements 112. The method 1000 also includes a step of (block 1006) coupling the wheel well assembly 194 to the airframe 102 of the aircraft 100 to form the nose landing gear bay 124 of the aircraft 100. The method 1000 also includes a step of (block 1012) coupling the subfloor assembly 208 to the wheel well assembly 194, in the pressurized space 106, to form a portion of the floor 204 (e.g., the flight deck floor 120) of the aircraft 100 so that the plurality of transport elements 112 is located between the floor-panel support 110 and the wheel well assembly 194.

In an example, the method 1000 further includes a step of (block 1016) coupling the plurality of transport elements 112 to the at least one high-level system 114 of the aircraft 100.

In an example, the method 1000 includes a step of (block 1010) forming the pressure boundary 104 delimiting the pressurized space 106 and the non-pressurized space 108 with the wheel well assembly 194 and the airframe 102.

In an example, according to the method 1000, the step of (block 1002) assembling the subfloor assembly 208 includes a step of coupling the plurality of transport elements 112 and the floor-panel support 110 together outside of the airframe 102. The step of (block 1012) coupling the subfloor assembly 208 to the wheel well assembly 194 includes a step of (block 1014) installing the subfloor assembly 208 within the airframe 102. In an example, the step of (block 1012) coupling the subfloor assembly 208 to the wheel well assembly 194 includes a step of coupling the floor-panel support 110 to the pressure deck 118.

In an example, the method 1000 includes a step of (block 1018) coupling the plurality of floor panels 116 to the floor-panel support 110. The plurality of floor panels 116 form a portion of the floor 204 (e.g., the flight deck floor 120) and cover the plurality of transport elements 112. At least a portion of the plurality of floor panels 116 is removable from the floor-panel support 110 to access the plurality of transport elements 112 from within the pressurized space 106.

In an example, the method 1000 includes a step of (block 1004) assembling the wheel well assembly 194. The wheel well assembly 194 includes the pressure deck 118. The wheel well assembly 194 also includes the first bulkhead 126, coupled to the pressure deck 118. The wheel well assembly 194 further includes the second bulkhead 128, coupled to the pressure deck 118, longitudinally spaced away from the first bulkhead 126. The wheel well assembly 194 also includes the nose landing gear box 134, coupled to the second bulkhead 128, opposite to the first bulkhead 126. The wheel well assembly 194 further includes the third bulkhead 132, coupled to the nose landing gear box 134, opposite to the second bulkhead 128.

In an example, according to the method 1000, the step of (block 1004) assembling the wheel well assembly 194 includes a step of coupling the pressure deck 118, the first bulkhead 126, the second bulkhead 128, the nose landing gear box 134, and the third bulkhead 132 together outside of the airframe 102. The step of (block 1006) coupling the wheel well assembly 194 to the airframe 102 includes a step of (block 1008) installing the wheel well assembly 194 within the airframe 102.

In an example, according to the method 1000, the nose landing gear box 134 includes the first sidewall 176, extending between and coupled to the third bulkhead 132 and the second bulkhead 128. The nose landing gear box 134 also includes the second sidewall 178, extending between and coupled to the third bulkhead 132 and the second bulkhead 128. The nose landing gear box 134 further includes the top wall 180, extending between and coupled to the first sidewall 176, the second sidewall 178, the third bulkhead 132, and the second bulkhead 128. The step of (block 1004) assembling the wheel well assembly 194 includes a step of coupling the top wall 180 of the nose landing gear box 134 and the pressure deck 118 together such that the top wall 180 and the pressure deck 118 share the common virtual plane 214.

In an example, the step of (block 1004) assembling the wheel well assembly 194 includes a step of sloping the pressure deck 118 upwardly from the second bulkhead 128 to the first bulkhead 126 with respect to the horizontal plane (e.g., the XY-plane).

In an example, according to the method 1000, the wheel well assembly 194 includes the plurality of support beams 146, configured to support the floor-panel support 110. Each one of the plurality of support beams 146 is spaced apart from an adjacent one of the plurality of support beams 146. The step of (block 1012) coupling the subfloor assembly 208 to the wheel well assembly 194 includes a step of locating a portion of the plurality of transport elements 112 between the adjacent pair 196 of the plurality of support beams 146.

In an example, the method 1000 includes a step of (block 1020) coupling the nose landing gear 136 to the wheel well assembly 194 within the nose landing gear bay 124.

In an example, according to the method 1000, the step of forming the pressure boundary 104 includes steps of: sealingly coupling the pressure deck 118 with the airframe 102 to form a portion of the pressure boundary 104; sealingly coupling the first bulkhead 126 with the pressure deck 118 and the airframe 102 to form a portion of the pressure boundary 104; sealingly coupling the second bulkhead 128 with the pressure deck 118 and the airframe 102 to form a portion of the pressure boundary 104; sealingly coupling the nose landing gear box 134 with the second bulkhead 128 and the airframe 102 to form a portion of the pressure boundary 104; and sealingly coupling the third bulkhead 132 with the nose landing gear box 134 and the airframe 102 to form a portion of the pressure boundary 104.

In an example, according to the method 1000, the second bulkhead 128 and the third bulkhead 132 react to the load transmitted by the nose landing gear 136 through the nose landing gear box 134. In an example, the method 1000 also includes a steps of coupling the first load-reacting member 138 to the second bulkhead 128 and to the external skin 174 of the airframe 102 and a step of coupling the second load-reacting member 140 to the third bulkhead 132 and to the external skin 174 of the airframe 102. The first load-reacting member 138 reacts to a load transmitted by the nose landing gear 136 through the second bulkhead 128. The second load-reacting member 140 reacts to a load transmitted by the nose landing gear 136 through the third bulkhead 132. The method 1000 may also include a step of coupling the third load-reacting member 186 to the nose landing gear box 134 and to the external skin 174 of the airframe 102.

Figure 16:
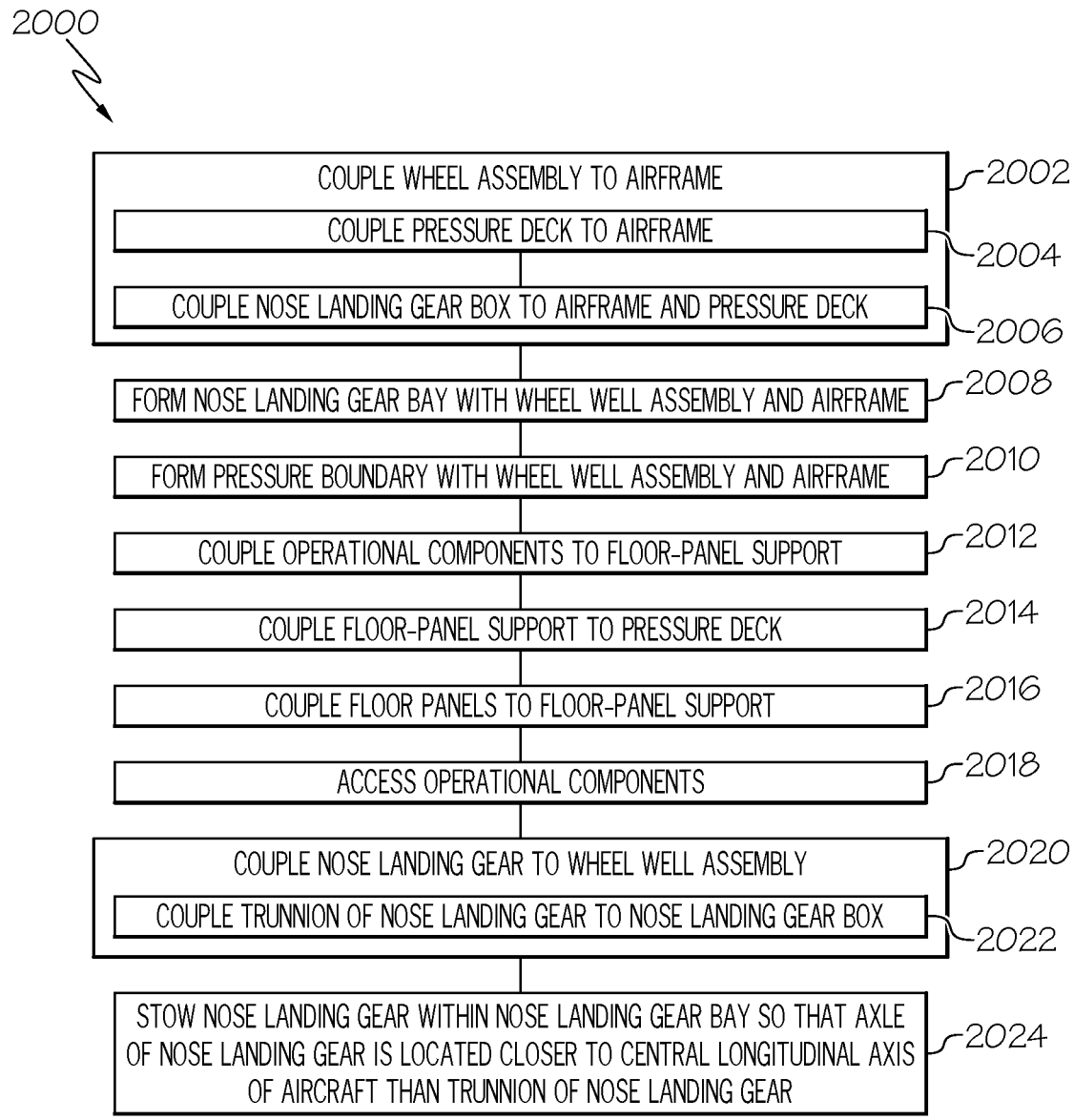
FIG. 16 is a flow diagram of an example of the method of making an aircraft.

FIG. 16 is a flow diagram of an example of a method 2000. In some examples, the method 2000 is applicable to making the aircraft 100 described herein. In some examples, the method 2000 is similarly applicable to making the nose structure 160 and/or the airframe 102 described herein.

Referring generally to FIGS. 1-14 and particularly to FIG. 16, in an example, the method 2000 includes a step of (block 2002) coupling the wheel well assembly 194 to the airframe 102 of the aircraft 100. The method 2000 also includes a step of (block 2008) forming the nose landing gear bay 124 with the wheel well assembly 194 and the airframe 102. The method 2000 further includes a step of (block 2020) coupling the nose landing gear 136 to the wheel well assembly 194. The method 2000 also includes a step of (block 2024) stowing the nose landing gear 136 within the nose landing gear bay 124 so that an axle 254 of the nose landing gear 136 is located closer to a central longitudinal axis 188 of the aircraft 100 than a trunnion 250 of the nose landing gear 136.

In an example, the method 2000 includes a step of (block 2010) forming the pressure boundary 104 that delimits the pressurized space 106 and the non-pressurized space 108 with the wheel well assembly 194 and the airframe 102. The nose landing gear bay 124 is located in the non-pressurized space 108.

In an example, according to the method 2000, the step of (block 2002) coupling the wheel well assembly 194 to the airframe 102 of the aircraft 100 comprises a step of (block 2004) coupling the pressure deck 118 of the wheel well assembly 194 to the airframe 102. The pressure deck 118 extends from the right side 198 of the airframe 102 to the left side 200 of the airframe 102 and slopes upwardly with respect to a horizontal plane in a forward direction.

In an example, the method 2000 includes a step of (block 2012) coupling the plurality of operational components 248 of the aircraft 100 to the floor-panel support 110. The method 2000 also includes a step of (block 2014) coupling the floor-panel support 110 to the pressure deck 118 so that the plurality of operational components 248 is located in the pressurized space 106 between the floor-panel support 110 and the pressure deck 118. The method 2000 further includes a step of (block 2016) coupling the plurality of floor panels 116 to the floor-panel support 110 to cover the plurality of operational components 248.

In an example, the method 2000 includes a step of (block 2018) accessing the plurality of operational components 248 by removing at least a portion of the plurality of floor panels 116.

In an example, according to the method 2000, the step of (block 2002) coupling the wheel well assembly 194 to the airframe 102 of the aircraft 100 includes a step of (block 2006) coupling the nose landing gear box 134 to the airframe 102 and to the pressure deck 118. The nose landing gear box 134 extends from the pressure deck 118 in a rearward direction. The step of (block 2020) coupling the nose landing gear 136 to the wheel well assembly 194 includes a step of (block 2022) coupling the trunnion 250 to the nose landing gear box 134.

In an example, according to the method 2000, the step of (block 2002) coupling the wheel well assembly 194 to the airframe 102 of the aircraft 100 includes a step of coupling the first bulkhead 126 to the pressure deck 118 and to the airframe 102. The first bulkhead 126 runs transversely between the right side 198 of the airframe 102 and the left side 200 of the airframe 102. The step of (block 2002) coupling the wheel well assembly 194 to the airframe 102 of the aircraft 100 also includes a step of coupling the second bulkhead 128 to the nose landing gear box 134 and to the airframe 102. The second bulkhead 128 runs transversely between the right side 198 of the airframe 102 and the left side 200 of the airframe 102 and is longitudinally spaces away from the first bulkhead 126. The step of (block 2002) coupling the wheel well assembly 194 to the airframe 102 of the aircraft 100 further includes a step of coupling the third bulkhead 132 to the nose landing gear box 134, opposite to the second bulkhead 128, and to the airframe 102. The third bulkhead 132 runs transversely between the right side 198 of the airframe 102 and the left side 200 of the airframe 102. The pressure deck 118 slopes upwardly with respect to the horizontal plane from the second bulkhead 128 to the first bulkhead 126.

Figure 17:
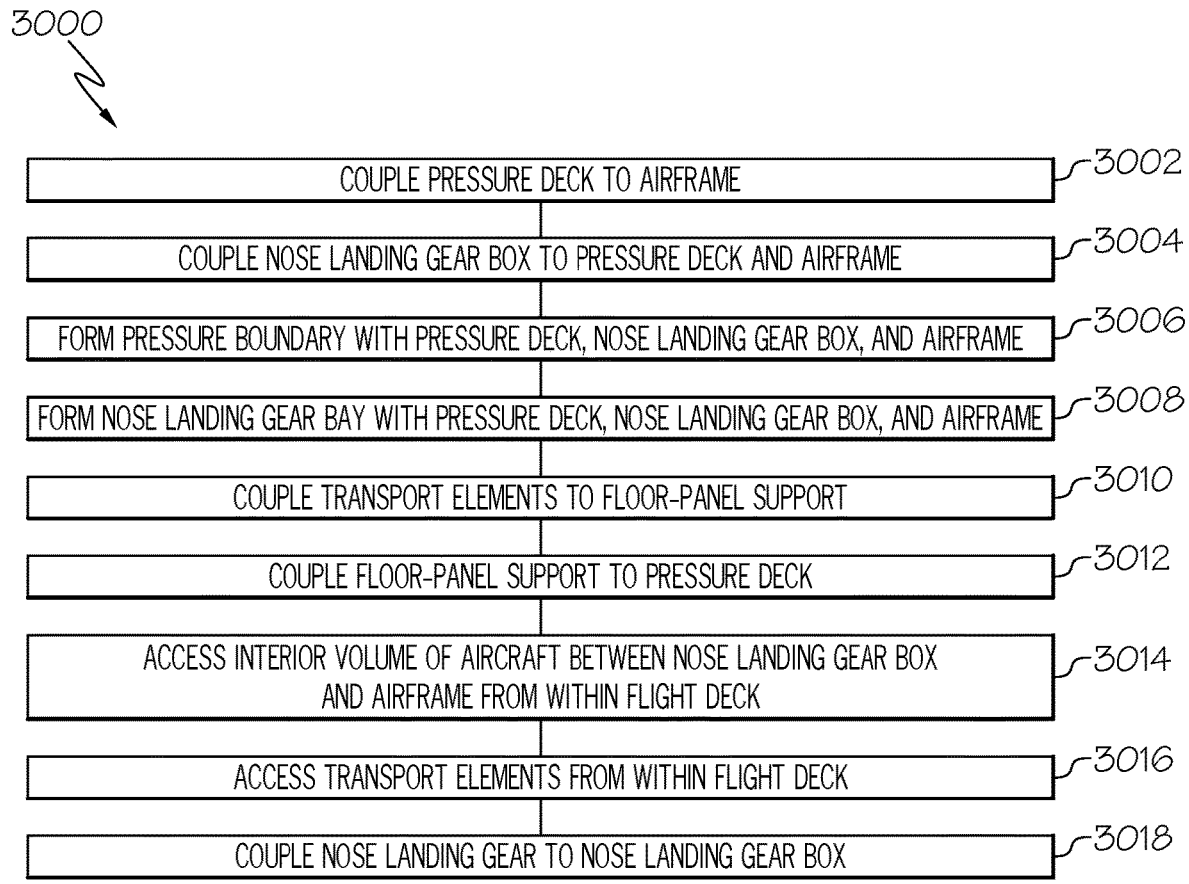
FIG. 17 is a flow diagram of an example of the method of making an aircraft.

FIG. 17 is a flow diagram of an example of a method 3000. In some examples, the method 3000 is applicable to making the aircraft 100 described herein. In some examples, the method 3000 is similarly applicable to making the nose structure 160 and/or the airframe 102 described herein.

Referring generally to FIGS. 1-14 and particularly to FIG. 17, in an example, the method 3000 includes a step of (block 3002) coupling the pressure deck 118 to the airframe 102 of the aircraft 100. The pressure deck 118 extends from the right side 198 of the airframe 102 to the left side 200 of the airframe 102. The method 3000 also includes a step of (block 3004) coupling the nose landing gear box 134 to the pressure deck 118 and to the airframe 102. The nose landing gear box 134 is located rearward of the pressure deck 118. The method 3000 further includes a step of (block 3006) forming a portion of the pressure boundary 104 that delimits the pressurized space 106 and the non-pressurized space 108 of the aircraft 100 with the pressure deck 118, the nose landing gear box 134, and the airframe 102. The method 3000 also includes a step of (block 3008) forming a portion of the nose landing gear bay 124 of the aircraft 100, located in the non-pressurized space 108, with the pressure deck 118, the nose landing gear box 134, and the airframe 102. The nose landing gear box 134 extends longitudinally in a forward direction and forms a portion of the nose landing gear bay 124 but does not extend the entire length of the nose landing gear bay 124. The method 3000 further includes a step of (block 3012) coupling the floor-panel support 110 to the pressure deck 118 and to the nose landing gear box 134 in the pressurized space 106 to form the flight deck floor 120 of the flight deck 122 above the nose landing gear bay 124. The method 3000 also includes a step of (block 3014) accessing the interior volume 256 of the aircraft 100, located between the nose landing gear box 134 and the airframe 102, from within the flight deck 122 through the floor-panel support 110.

In an example, the method 3000 includes a step of (block 3018) coupling the nose landing gear 136 of the aircraft 100 to the nose landing gear box 134 so that the nose landing gear 136 is stowable within the nose landing gear bay 124 below the pressure deck 118.

In an example, the method 3000 includes a step of (block 3010) coupling the plurality of transport elements 112, associated with the at least one high-level system 114 of the aircraft 100, to the floor-panel support 110 before the step of (block 3012) coupling the floor-panel support 110 to the pressure deck 118 and the nose landing gear box 134 so that the plurality of transport elements 112 is located between the floor-panel support 110 and the pressure deck 118 and between the floor-panel support 110 and the nose landing gear box 134. The method 3000 also includes a step of (block 3016) accessing the plurality of transport elements 112 from within the flight deck 122 through the floor-panel support 110.

Figure 18:
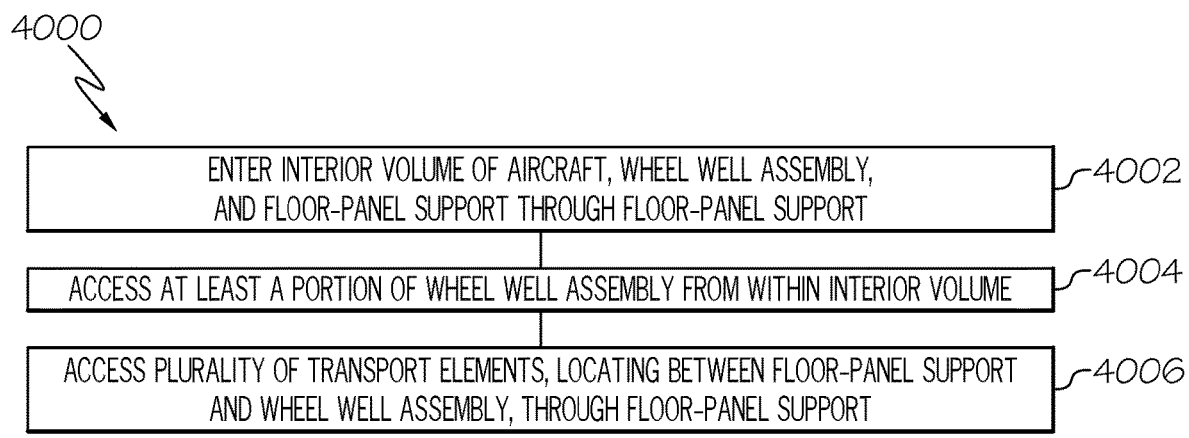
FIG. 18 is a flow diagram of an example of a method of accessing a portion of an aircraft.

FIG. 18 is a flow diagram of an example of a method 4000 of accessing a portion of the aircraft 100. In some examples, the method 4000 is applicable to assembling the portion of the aircraft 100. In some examples, the method 4000 is applicable to inspecting the portion of the aircraft 100. In some examples, the method 4000 is applicable to performing maintenance on the portion of the aircraft 100.

Referring generally to FIGS. 1-14 and particularly to FIG. 18, in an example, the method 4000 includes a step of (block 4002) entering the interior volume 256 of the aircraft 100 through the floor-panel support 110. In an example, according to the method 4000, the interior volume 256 is formed by the airframe 102, the wheel well assembly (194), coupled to the airframe (102), and the floor-panel support (110), coupled to the wheel well assembly (194). The method (4000) also includes a step of (block 4004) accessing at least a portion of the wheel well assembly 194 from within the interior volume 256. In accordance with the method 4000, the interior volume 256 and the components of the wheel well assembly 194 (e.g., the first bulkhead 126, the second bulkhead 128, the third bulkhead 132, the nose landing gear box 134, and the pressure deck 118) and the airframe 102 are accessible through the floor-panel support 110 from within the flight deck 122.

The present disclosure recognizes and takes into account that in certain aircraft designs, a wheel well structure and an interior volume between the wheel well structure and an airframe is accessed through openings in longitudinal bulkheads forming the wheel well structure, which are entered through a nose landing gear bay. This means of entry is difficult and uncomfortable for an operator. The configuration of the nose structure 160 and methods disclosed herein advantageously reduce the difficulty for an operator accessing the wheel well assembly 194, such as during assembly, inspection, and/or maintenance, by providing access to the wheel well assembly 194 through the floor-panel support 110 from within the flight deck 122.

The present disclosure also recognizes and takes into account that in certain aircraft designs, the longitudinal bulkheads forming the wheel well structure extend the entire length of a nose landing gear bay of an aircraft. In such a design, the interior volume formed between the longitudinal bulkheads and an airframe is very small toward the front end of the aircraft, making access difficult. The configuration of the nose structure 160 and methods disclosed herein advantageously ease access by having the longitudinal components of the wheel well assembly 194 (e.g., the nose landing gear box 134) extend only a portion of the nose landing gear bay 124.

In an example, the method 4000 includes a step of (block 4006) accessing at least a portion of the plurality of transport elements 112, locating between the floor-panel support 110 and the wheel well assembly 194, through the floor-panel support 110. In accordance with the method 4000, the plurality of transport elements 112 and/or the plurality of operational components 248 are accessible through the floor-panel support 110 from within the flight deck 122.

The present disclosure recognizes and takes into account that in certain aircraft designs, operational components and/or transport elements associated with high-level system of an aircraft are typically located within an interior volume formed between the longitudinal bulkheads forming the wheel well structure and an airframe. In such a design, access to these components is difficult for an operator. The configuration of the nose structure 160 and methods disclosed herein advantageously reduces the difficulty for an operator accessing the plurality of transport elements 112 and/or the plurality of operational components 248, such as during assembly, inspection, and/or maintenance by providing access to the plurality of transport elements 112 and/or the plurality of operational components 248 through the floor-panel support 110 from within the flight deck 122.

Figure 19:
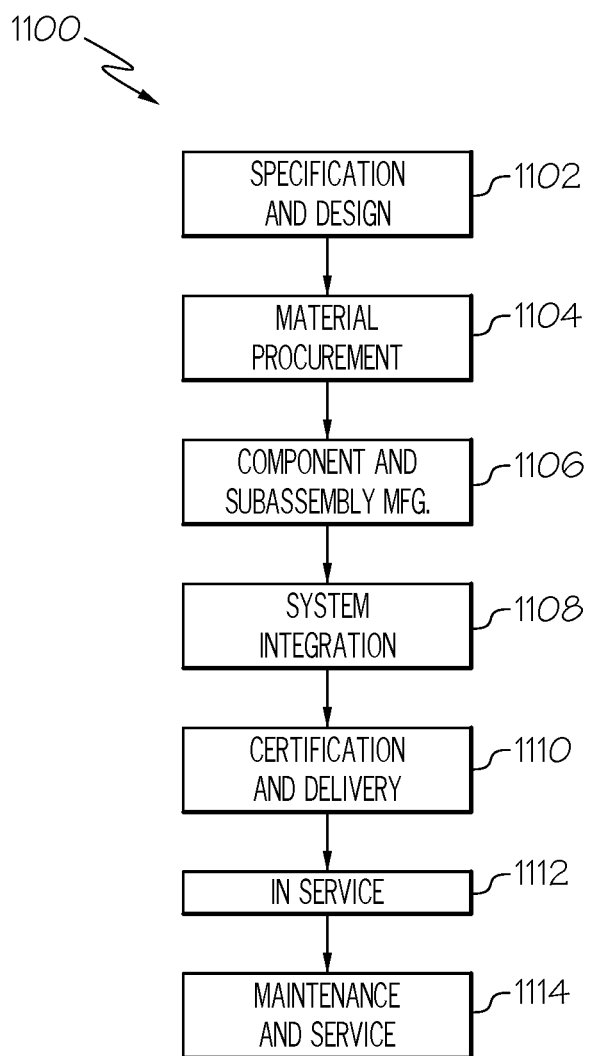
FIG. 19 is a flow diagram of an aircraft manufacturing and service methodology.
Figure 20:
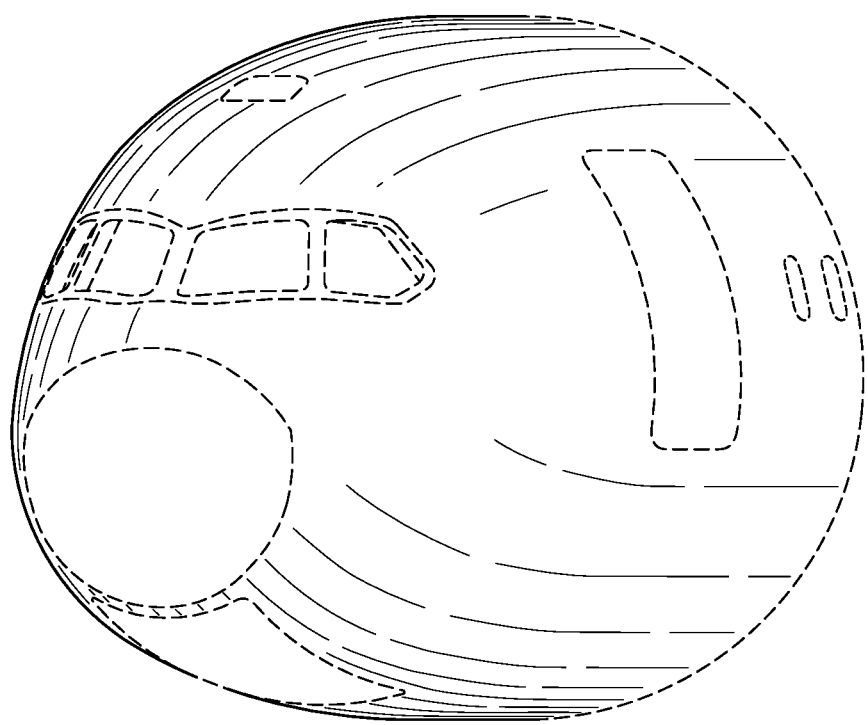
FIG. 20 is a front and side perspective view of a nose section of an aircraft, depicting the ornamental design thereof.
Figure 21:
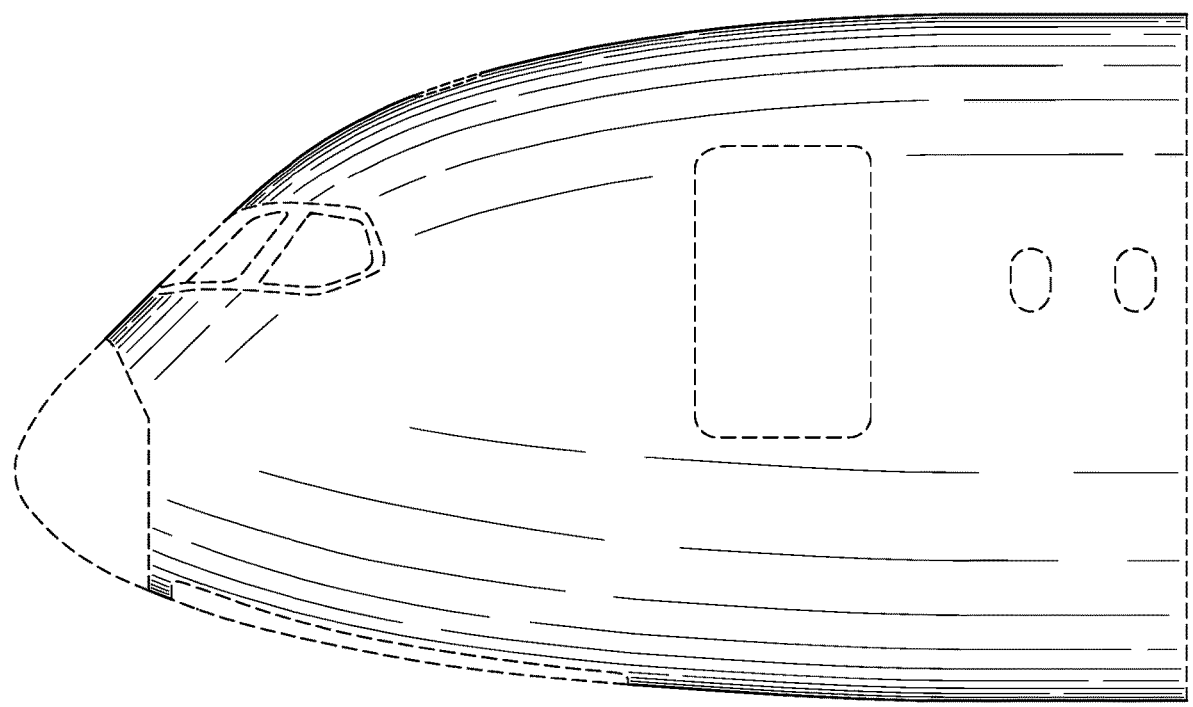
FIG. 21 is a left side view of the nose section of an aircraft of FIG. 20.
Figure 22:
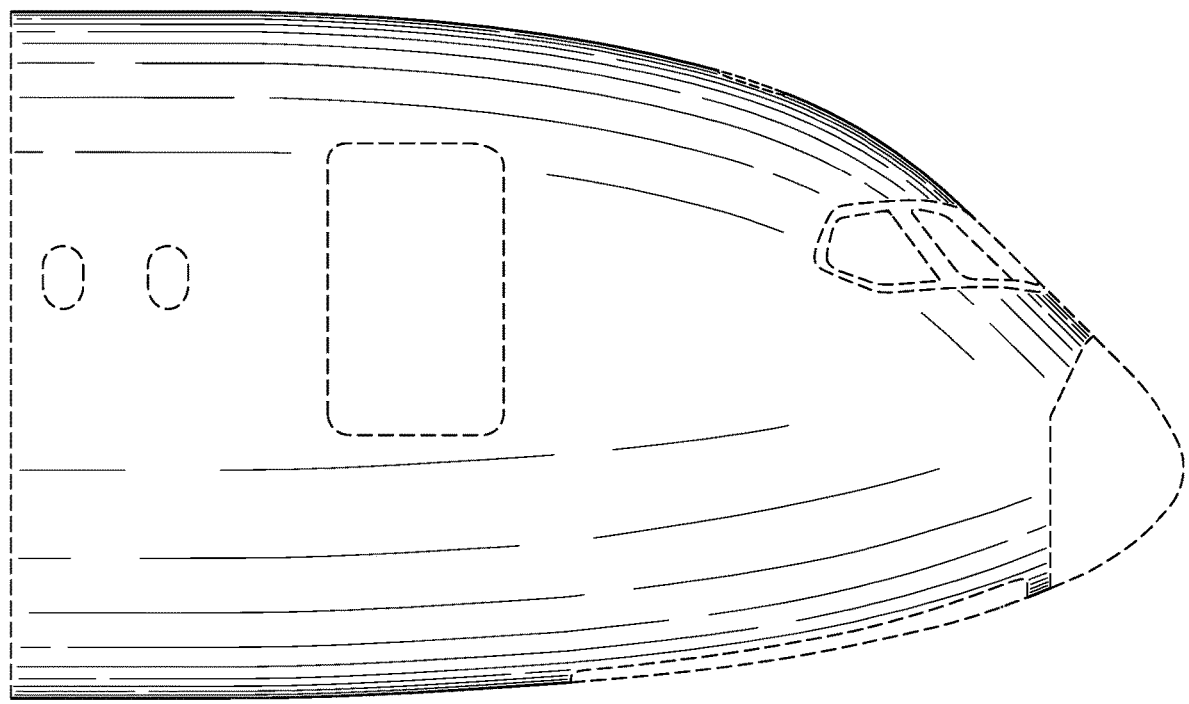
FIG. 22 is a right side view of the nose section of an aircraft of FIG. 20.
Figure 23:
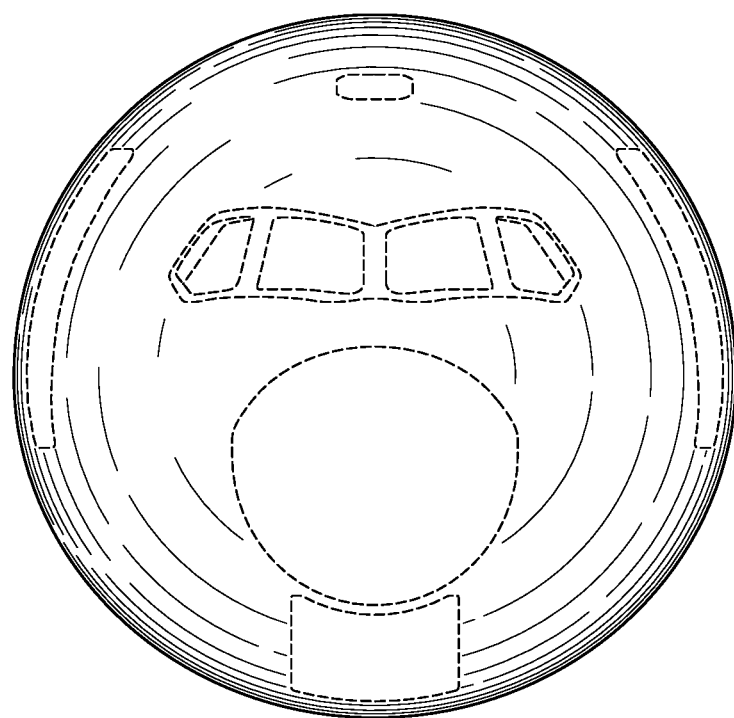
FIG. 23 is a front view of the nose section of an aircraft of FIG. 20.
Figure 24:
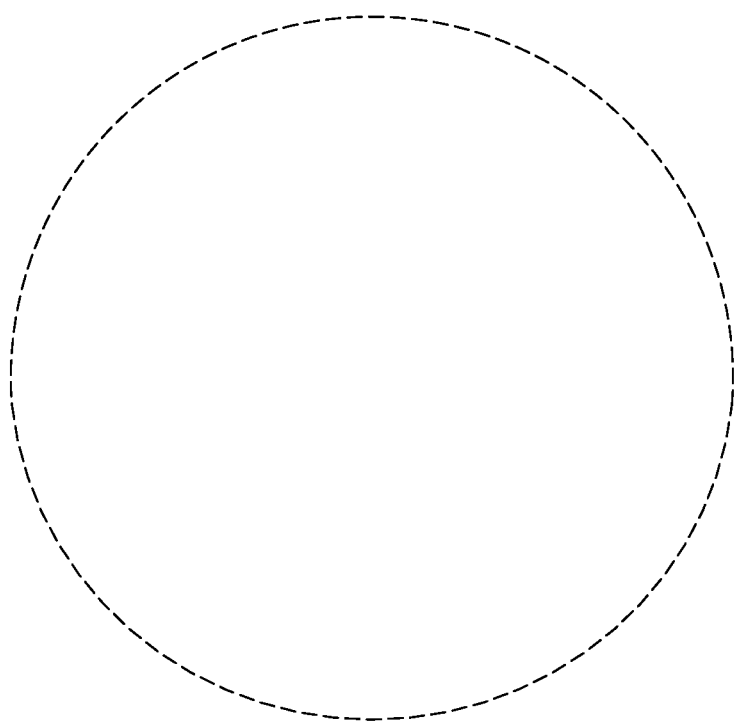
FIG. 24 is a rear view of the nose section of an aircraft of FIG. 20.
Figure 25:
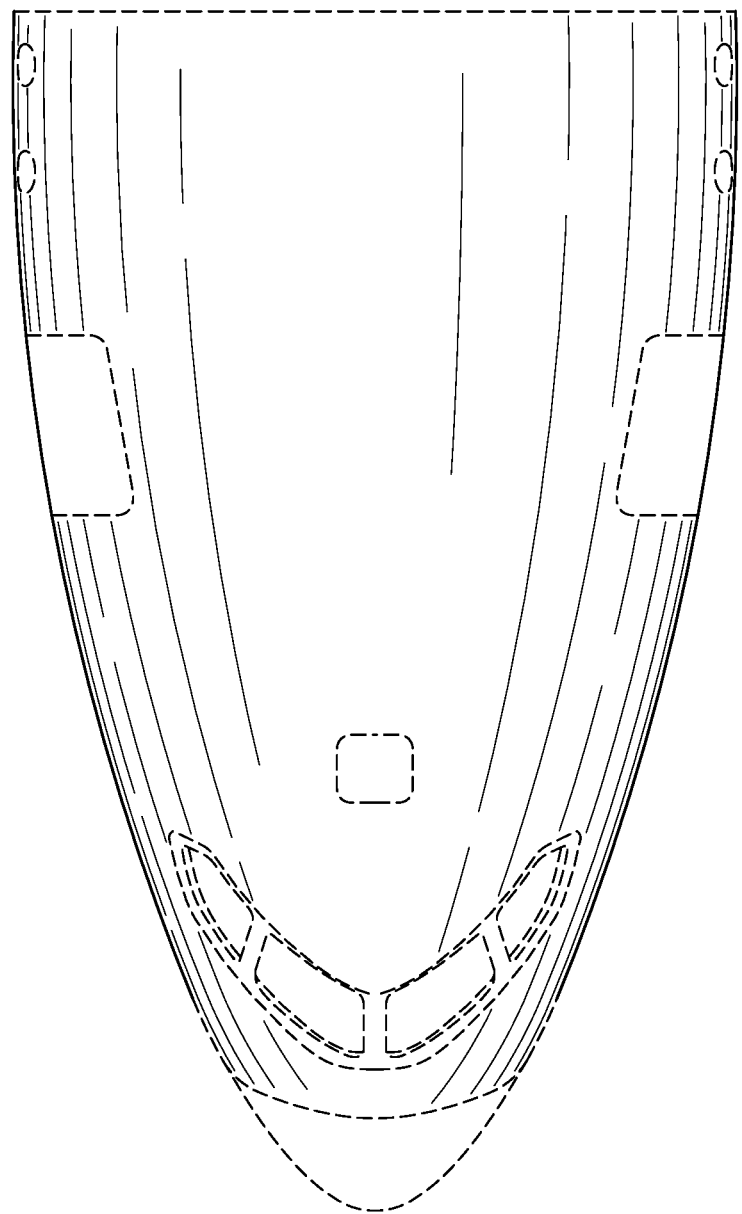
FIG. 25 is top view of the nose section of an aircraft of FIG. 20.
Figure 26:
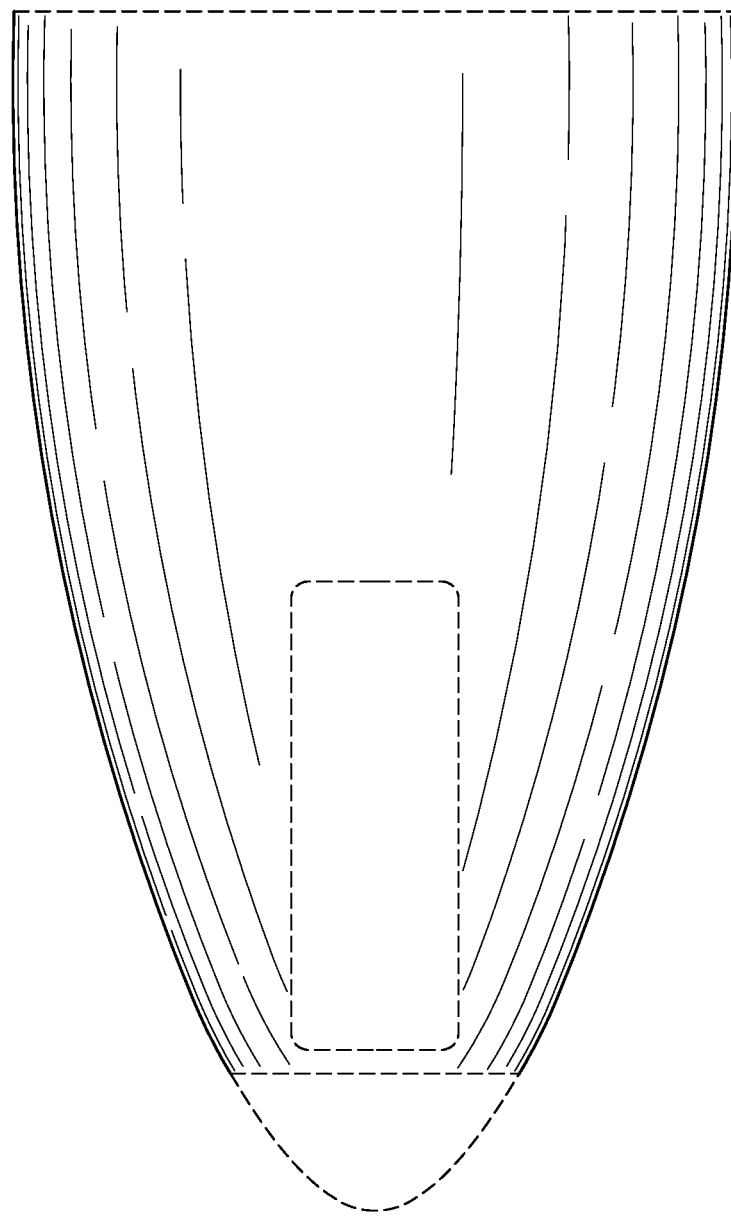
FIG. 26 is a bottom view of the nose section of an aircraft of FIG. 20.

Referring now to FIG. 19, examples of the nose structure 160, the airframe 102, the aircraft 100, and methods 1000, 2000, 3000, 4000 may be used in the context of an aircraft manufacturing and service method 1100, as shown in the flow diagram of FIG. 19. Aircraft applications may include manufacturing and servicing the aircraft 100 that includes the configurations of the nose structure 160 and the airframe 102 disclosed herein.

As illustrated in FIG. 19, during pre-production, the method 1100 may include specification and design of aircraft 100 (block 1102) and material procurement (block 1104). During production of the aircraft 100, component and subassembly manufacturing (block 1106) and system integration (block 1108) of the aircraft 100 may take place. Thereafter, the aircraft 100 may go through certification and delivery (block 1110) to be placed in service (block 1112). Implementation of the disclosed nose structure 160, airframe 102, and method 1000 may form a portion of component and subassembly manufacturing (block 1106) and/or system integration (block 1108). Routine maintenance and service (block 1114) may include modification, reconfiguration, refurbishment, etc. of one or more systems of the aircraft 100.

Each of the processes of the method 1100 illustrated in FIG. 19 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the nose structure 160, the airframe 102, the aircraft 100, and the methods 1000, 2000, 3000, 4000 shown or described herein may be employed during any one or more of the stages of the aircraft manufacturing and service method 1100, shown in the flow diagram illustrated by FIG. 18. For example, assembly and installation of the subfloor assembly 208 and the wheel well assembly 194 may correspond to component and subassembly manufacturing (block 1106) and may be prepared in a manner similar to components or subassemblies prepared while the aircraft 100 is in service (block 1112). Also, one or more examples of the nose structure 160, the airframe 102, the aircraft 100, and the methods 1000, 2000, 3000, 4000 described herein may be utilized during system integration (block 1108) and certification and delivery (block 1110). Similarly, one or more examples of the nose structure 160, the airframe 102, the aircraft 100, and the methods 1000, 2000, 3000, 4000 described herein may be utilized, for example and without limitation, while the aircraft 100 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to other vehicle structures (e.g., land vehicles, marine vehicles, space vehicles, etc.) and stand-alone structures where structures are required to delimit a pressurized space and a non-pressurized space and a reduction in overall volume is beneficial.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, integrally formed, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

FIGS. 1-14, referred to above, schematically illustrate examples of the disclosed nose structure 160, airframe 102 and aircraft 100 and do not necessarily imply any particular structure. Accordingly, modifications, additions and/or omissions may be made to the illustrated structure. Additionally, those skilled in the art will appreciate that not all elements described and illustrated in FIGS. 1-14, referred to above, need be included in every example and not all elements described herein are necessarily depicted in each illustrative example. Unless otherwise explicitly stated, the schematic illustrations of examples depicted in FIGS. 1-14, referred to above, are not meant to imply structural limitations with respect to the illustrative example. Rather, although one illustrative structure is indicated, it is to be understood that the structure may be modified when appropriate.

In FIGS. 15-19, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 15-19 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the nose structure 160, the airframe 102, the aircraft 100, and the method 1000 have been shown and described, modifications may occur to those skilled in the art upon reading the specification. The present application includes such modifications and is limited only by the scope of the claims.

Referring to FIGS. 20-26, also disclosed is an ornamental design for a nose section of an aircraft. The broken lines shown in FIGS. 20-26 are for illustrative purposes only and form no part of the disclosed design.

What is claimed is:
1. A method of making an aircraft, the method comprising steps of:

assembling a subfloor assembly, comprising by coupling a floor-panel support and a plurality of transport elements together outside of an airframe of the aircraft;

coupling a wheel well assembly to the airframe of the aircraft to form a nose landing gear bay of the aircraft; and coupling the subfloor assembly to the wheel well assembly by installing the subfloor assembly within the airframe to form a portion of a floor of the aircraft so that the plurality of transport elements is located between the floor-panel support and the wheel well assembly.

2. The method of claim 1, further comprising coupling the plurality of transport elements to at least one high-level system of the aircraft.

3. The method of claim 1, further comprising forming a pressure boundary delimiting a pressurized space and a non-pressurized space with the wheel well assembly and the airframe, wherein the subfloor assembly is located in the pressurized space.

4. The method of claim 3, further comprising:
coupling a plurality of floor panels to the floor-panel support, wherein the plurality of floor panels form a portion of the floor and cover the plurality of transport elements; and
accessing the plurality of transport elements from within the pressurized space by removing at least a portion of the plurality of floor panels from the floor-panel support.

5. The method of claim 3, further comprising a step of assembling the wheel well assembly, the wheel well assembly comprising:
a pressure deck;
a first bulkhead, coupled to the pressure deck;
a second bulkhead, coupled to the pressure deck, longitudinally spaced away from the first bulkhead;
a nose landing gear box, coupled to the second bulkhead, opposite to the first bulkhead; and
a third bulkhead, coupled to the nose landing gear box, opposite to the second bulkhead.

6. The method of claim 5, wherein
the step of assembling the wheel well assembly comprises coupling the pressure deck, the first bulkhead, the second bulkhead, the nose landing gear box, and the third bulkhead together outside of the airframe.

7. The method of claim 5, wherein:
the nose landing gear box comprises:
a first sidewall, extending between and coupled to the third bulkhead and the second bulkhead;
a second sidewall, extending between and coupled to the third bulkhead and the second bulkhead; and
a top wall, extending between and coupled to the first sidewall, the second sidewall, the third bulkhead, and the second bulkhead; and
the step of assembling the wheel well assembly comprises coupling the nose landing gear box and the pressure deck together.

8. The method of claim 7, wherein the step of assembling the wheel well assembly comprises coupling the pressure deck to the top wall of the nose landing gear box.

9. The method of claim 8, wherein the step of assembling the wheel well assembly comprises a step of coupling the pressure deck to the top wall of the nose landing gear box such that the pressure deck and the top wall share a virtual plane.

10. The method of claim 9, wherein the step of assembling the wheel well assembly comprises sloping the pressure deck upwardly from the second bulkhead to the first bulkhead with respect to a horizontal plane.

11. The method of claim 5, wherein the step of coupling the subfloor assembly to the wheel well assembly comprises coupling the floor-panel support to the pressure deck.

12. The method of claim 1, wherein:
the wheel well assembly comprises a plurality of support beams, configured to support the floor-panel support;
each one of the plurality of support beams is spaced apart from an adjacent one of the plurality of support beams; and
the step of coupling the subfloor assembly to the wheel well assembly comprises locating a portion of the plurality of transport elements between an adjacent pair of the plurality of support beams.

13. The method of claim 1, further comprising coupling a nose landing gear to the wheel well assembly within the nose landing gear bay.

14. The method of claim 13, further comprising stowing the nose landing gear within the nose landing gear bay so that an axle of the nose landing gear is located closer to a central longitudinal axis of the aircraft than a trunnion of the nose landing gear.

15. A method of making an aircraft, the method comprising steps of:
coupling a wheel well assembly to an airframe of the aircraft, wherein the wheel well assembly comprises:
a first bulkhead;
a second bulkhead, longitudinally spaced away from the first bulkhead and comprising an opening;
a third bulkhead, longitudinally spaced away from the second bulkhead opposite the first bulkhead;
a pressure deck, extending between the second bulkhead and the first bulkhead;
a first sidewall, extending from the second bulkhead about the opening to the third bulkhead;
a second sidewall, opposite the first sidewall and extending from the second bulkhead about the opening to the third bulkhead; and
a top wall, extending from the second bulkhead about the opening to the third bulkhead between the first sidewall and the second sidewall;
forming a nose landing gear bay from the wheel well assembly and the airframe;
coupling a nose landing gear to the wheel well assembly; and
stowing the nose landing gear within the nose landing gear bay so that an axle of the nose landing gear is located closer to a central longitudinal axis of the aircraft than a trunnion of the nose landing gear.

16. The method of claim 15, further comprising forming a pressure boundary that delimits a pressurized space and a non-pressurized space from the wheel well assembly and the airframe, wherein the nose landing gear bay is located in the non-pressurized space.

17. The method of claim 15, wherein:
the step of coupling the wheel well assembly to the airframe of the aircraft comprises coupling the pressure deck to the airframe such that the pressure deck extends from a right side of the airframe to a left side of the airframe and slopes upwardly with respect to a horizontal plane in a forward direction.

18. The method of claim 15, further comprising:
coupling a plurality of operational components of the aircraft to a floor-panel support to form a subfloor assembly;

coupling the subfloor assembly to the pressure deck so that the plurality of operational components is located in the pressurized space between the floor-panel support and the pressure deck; and coupling a plurality of floor panels to the floor-panel support to cover the plurality of operational components.

19. The method of claim 18, further comprising accessing the plurality of operational components by removing at least a portion of the plurality of floor panels.

20. The method of claim 18, further comprising:
assembling the wheel well assembly outside of the aircraft;
assembling the subfloor assembly outside of the aircraft;
coupling the subfloor assembly to the pressure deck of the wheel well assembly is performed inside the aircraft.

21. The method of claim 15, further comprising coupling the trunnion to the wheel well assembly.

22. The method of claim 15, wherein:
the step of coupling the wheel well assembly to the airframe of the aircraft further comprises:
coupling the first bulkhead to the airframe such that the first bulkhead runs transversely between the right side of the airframe and the left side of the airframe;
coupling the second bulkhead to the airframe such that the second bulkhead runs transversely between the right side of the airframe and the left side of the airframe;
coupling the third bulkhead to the airframe such that the third bulkhead runs transversely between the right side of the airframe and the left side of the airframe; and
coupling the pressure deck to the first bulkhead, the second bulkhead, and the airframe such that the pressure deck slopes upwardly with respect to a horizontal plane from the second bulkhead to the first bulkhead.

23. A method of making an aircraft, the method comprising:
coupling a pressure deck to an airframe of the aircraft, wherein the pressure deck extends from a right side of the airframe to a left side of the airframe;
coupling a nose landing gear box to the pressure deck and to the airframe, wherein the nose landing gear box is located rearward of the pressure deck;
forming a portion of a pressure boundary that delimits a pressurized space and a non-pressurized space of the aircraft with the pressure deck, the nose landing gear box, and the airframe;

forming a portion of a nose landing gear bay of the aircraft, located in the non-pressurized space, with the pressure deck, the nose landing gear box, and the airframe;
coupling a floor-panel support to the pressure deck and to the nose landing gear box in the pressurized space to form a flight deck floor of a flight deck above the nose landing gear bay; and
accessing an interior volume of the aircraft, located between the nose landing gear box and the airframe, from within the flight deck through the floor-panel support.

24. The method of claim 23, further comprising coupling a nose landing gear of the aircraft to the nose landing gear box so that the nose landing gear is stowable within the nose landing gear bay below the pressure deck.

25. The method of claim 24, further comprising:
coupling a plurality of transport elements, associated with at least one high-level system of the aircraft, to the floor-panel support before coupling the floor-panel support to the pressure deck and the nose landing gear box so that the plurality of transport elements is located between the floor-panel support and the pressure deck and between the floor-panel support and the nose landing gear box; and
accessing the plurality of transport elements from within the flight deck through the floor-panel support.

26. A method of accessing a portion of an aircraft, the method comprising:
entering an interior volume of the aircraft, formed by an airframe, a wheel well assembly, coupled to the airframe, and a subfloor assembly, coupled to the wheel well assembly; and
accessing at least a portion of the wheel well assembly from within the interior volume,
wherein:
the subfloor assembly comprises a floor-panel support and a plurality of transport elements; and
the subfloor assembly is coupled to the wheel well assembly through the floor panel support such that the plurality of transport elements is located between the floor-panel support and the wheel well assembly.

27. The method of claim 26, further comprising:
accessing at least a portion of the plurality of transport elements, locating between the floor-panel support and the wheel well assembly, through the floor-panel support.

* * * * *